(12) United States Patent
Moriwaki et al.

(10) Patent No.: US 11,286,695 B2
(45) Date of Patent: Mar. 29, 2022

(54) VEHICLE DOOR HANDLE MOUNTING STRUCTURE

(71) Applicant: MAZDA MOTOR CORPORATION, Hiroshima (JP)

(72) Inventors: Toshihide Moriwaki, Hiroshima (JP); Takatoshi Furukawa, Hiroshima (JP); Jiyou Piao, Hatsukaichi (JP); Takashi Niseki, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 665 days.

(21) Appl. No.: 16/206,793

(22) Filed: Nov. 30, 2018

(65) Prior Publication Data
US 2019/0186178 A1    Jun. 20, 2019

(30) Foreign Application Priority Data

Dec. 15, 2017   (JP) .............................. JP2017-240884

(51) Int. Cl.
| | | |
|---|---|---|
| *E05B 85/10* | (2014.01) | |
| *E05B 79/06* | (2014.01) | |
| *E05B 83/18* | (2014.01) | |
| *E05B 83/16* | (2014.01) | |
| *B60R 13/00* | (2006.01) | |
| *E05B 79/22* | (2014.01) | |

(52) U.S. Cl.
CPC ............ *E05B 83/18* (2013.01); *B60R 13/005* (2013.01); *E05B 79/06* (2013.01); *E05B 79/22* (2013.01); *E05B 83/16* (2013.01); *E05B 85/10* (2013.01); *E05Y 2201/11* (2013.01); *E05Y 2400/86* (2013.01); *E05Y 2900/548* (2013.01)

(58) Field of Classification Search
CPC ........ E05B 83/16; E05B 83/18; E05B 1/0084; E05B 85/10
See application file for complete search history.

(56) References Cited

U.S. PATENT DOCUMENTS

| | | | | |
|---|---|---|---|---|
| 5,706,554 A | * | 1/1998 | Ruckert ................... | E05B 9/084 16/438 |
| 6,241,294 B1 | * | 6/2001 | Young ..................... | E05B 77/04 292/251.5 |
| 6,575,508 B2 | * | 6/2003 | Stuart ...................... | E05B 77/06 292/336.3 |
| 7,062,945 B2 | * | 6/2006 | Saitoh .................... | B60R 25/246 49/460 |

(Continued)

FOREIGN PATENT DOCUMENTS

| | | | | |
|---|---|---|---|---|
| CN | | 1671940 A | 9/2005 | |
| CN | | 101165301 A | * 4/2008 | ........... E05B 85/045 |

(Continued)

*Primary Examiner* — Carlos Lugo
(74) *Attorney, Agent, or Firm* — Studebaker & Brackett PC

(57) ABSTRACT

A vehicle door handle mounting structure (1) includes: a vehicle door (3) including a decoration member (5) mounted on a front side of an outer panel (31) and having a coupling portion (522) that is placed in an opening (312) of the outer panel (31); a door handle (4) mounted in the decoration member (5); and a bracket (9) coupled to the coupling portion (522) from a back side of the outer panel (31) and, together with the decoration member (5), holding the outer panel (31) therebetween.

5 Claims, 14 Drawing Sheets

(56) References Cited

U.S. PATENT DOCUMENTS

| | | | |
|---|---|---|---|
| 7,078,640 B2* | 7/2006 | Miyake | E05B 81/76 200/293.1 |
| 7,226,096 B2* | 6/2007 | Ito | E05B 1/0053 292/336.3 |
| 7,387,004 B2* | 6/2008 | Schutz | E05B 85/107 70/208 |
| 7,387,321 B2* | 6/2008 | Tanaka | E05B 77/04 292/336.3 |
| 7,454,933 B1* | 11/2008 | Paige | E05B 1/0092 292/207 |
| 7,777,141 B2* | 8/2010 | Ishiguro | E05B 83/16 200/61.52 |
| 8,408,611 B2* | 4/2013 | Takagai | E05B 85/13 292/336.3 |
| 8,727,401 B2* | 5/2014 | Tanaka | E05B 85/13 292/336.3 |
| 8,851,536 B2* | 10/2014 | Savant | E05B 85/10 292/336.3 |
| 10,301,857 B2* | 5/2019 | Satou | H01H 13/06 |
| 10,438,758 B2* | 10/2019 | Kim | B60R 13/005 |
| 2001/0005084 A1* | 6/2001 | Ponziani | B62D 29/043 296/56 |
| 2006/0162405 A1 | 7/2006 | Schutz et al. | |
| 2011/0167731 A1 | 7/2011 | Zagromski | |
| 2013/0168980 A1* | 7/2013 | Minemura | E05B 79/06 292/336.3 |
| 2015/0074943 A1 | 3/2015 | Toyama et al. | |
| 2016/0343522 A1* | 11/2016 | Kang | E05B 83/18 |
| 2017/0002589 A1 | 1/2017 | Toyama | |
| 2019/0093411 A1* | 3/2019 | Fukui | B60Q 1/56 |
| 2019/0218832 A1* | 7/2019 | Hansen | E05B 63/0056 |

FOREIGN PATENT DOCUMENTS

| | | | |
|---|---|---|---|
| CN | 102159413 A | 8/2011 | |
| CN | 105239862 A | 1/2016 | |
| CN | 106103870 A | 11/2016 | |
| CN | 110005285 A * | 7/2019 | |
| DE | 7034349 U | 12/1970 | |
| DE | 10123939 A1 | 1/2003 | |
| DE | 102008029447 A1 * | 12/2009 | E05B 81/76 |
| DE | 102008035059 A1 | 1/2010 | |
| EP | 1803595 A1 * | 7/2007 | E05B 81/76 |
| JP | 2013231301 A | 11/2013 | |
| JP | 2014-172572 A | 9/2014 | |
| WO | 2004/013435 A1 | 2/2004 | |

* cited by examiner

VEHICLE DOOR HANDLE MOUNTING STRUCTURE

CROSS-REFERENCE TO RELATED APPLICATION

This application claims priority to Japanese Patent Application No. 2017-240884 filed on Dec. 15, 2017, the entire disclosure of which is incorporated by reference herein.

BACKGROUND

The present disclosure relates to vehicle door handle mounting structures including a decoration member that is mounted on the outer surface of a vehicle door (e.g., a back door) and a door handle that is mounted on the decoration member.

In a vehicle door handle mounting structure described in Japanese Unexamined Patent Publication No. 2014-172572, a decoration member (e.g., a garnish) is mounted on the outer surface of a back door and a door handle is mounted on the back side of the decoration member in order to use the decoration member as a door handle.

SUMMARY

In the case where a decoration member is mounted on the outer surface of a back door and a door handle is mounted on the back side of the decoration member in order to use the decoration member as a door handle as described above, the decoration member is subjected to load when the user operates the door handle. The decoration member therefore need be firmly fixed to the back door.

In the case where the decoration member is used as a door handle, the decoration member is typically fixed to the back door with bolts and nuts. Accordingly, if the decoration member is a wide member, the decoration member can be fixed at many points to the back door. The decoration member can thus be firmly fixed to the back door.

However, if the decoration member is a narrow member like a mascot, the decoration member cannot be fixed at many points to the back door. For example, the decoration member can be fixed at only a few points in its upper part to the back door. The decoration member therefore cannot be firmly fixed to the back door, resulting in insufficient mounting rigidity of the decoration member on the back door.

It is an object of the present disclosure to provide a vehicle door handle mounting structure that provides sufficient mounting rigidity of a decoration member on a vehicle door even if the decoration member is a narrow member.

A vehicle door handle mounting structure according to the present disclosure is a vehicle door handle mounting structure including: a vehicle door including an outer panel having an opening; a decoration member mounted on a front side of the outer panel and having a coupling portion that is placed in the opening of the outer panel; a door handle mounted in the decoration member; and a bracket coupled to the coupling portion from a back side of the outer panel and, together with the decoration member, holding the outer panel therebetween.

With this configuration, the door handle is mounted in the decoration member mounted on the outer panel of the vehicle door. Accordingly, the decoration member can also be used as the door handle. The coupling portion of the decoration member is placed in the opening of the outer panel, the bracket is coupled to the coupling portion from a back side of the outer panel, and the outer panel is held between the bracket and the decoration member. The decoration member is thus firmly fixed to the outer panel. Sufficient mounting rigidity of the decoration member on the outer panel (i.e., the vehicle door) is thus provided even if the decoration member is narrow and cannot be fixed at many points to the outer panel by fixing parts such as bolts and nuts.

In one aspect of the present disclosure, the decoration member may have a decoration member body and a housing mounted on a back side of the decoration member body and supporting the door handle. The housing may have a back-side case portion fixed to a back surface of the decoration member, and an accommodating recess formed so as to be recessed from a front side toward a back side of the back-side case portion and accommodating the door handle. The accommodating recess may project from the back side of the back-side case portion to form the coupling portion.

With this configuration, the accommodating recess of the decoration member in which the door handle is placed also serves as the coupling portion. Accordingly, the coupling portion need not be provided separately, whereby reduction in size of the decoration member is achieved.

In one aspect of the present disclosure, an outer peripheral edge of the decoration member may be placed on the front side of the outer panel. The bracket may have a holding portion that is placed over the outer peripheral edge of the decoration member from the back side of the outer panel. The outer panel may be held between the outer peripheral edge of the decoration member and the holding portion of the bracket.

With this configuration, the outer peripheral edge of the decoration member together with the bracket holds the outer panel therebetween. The outer panel is thus stably held between the decoration member and the bracket. Since the outer peripheral edge of the decoration member is used to hold the outer panel, a relatively large region of the outer panel can be held. The outer panel is thus stably held between the decoration member and the bracket.

In one aspect of the present disclosure, the outer panel may have in its surface a stepped recessed portion on which the decoration member is mounted. A stepped peripheral wall of the stepped recessed portion may be tilted outward in a radial direction. The outer peripheral edge of the decoration member may be placed on a front side of the stepped peripheral wall of the stepped recessed portion. The holding portion of the bracket may be placed on a back side of the stepped peripheral wall of the stepped recessed portion.

With this configuration, the stepped peripheral wall of the stepped recessed portion for mounting the decoration member, which is tilted outward in the radial direction, is used as a portion that is held between the decoration member and the bracket. Accordingly, a relatively large region of the outer panel can be used as the portion that is held between the decoration member and the bracket. Since the stepped peripheral wall used as the portion that is held between the decoration member and the bracket is tilted outward, the position of the portion that is held between the decoration member and the bracket is restrained from being displaced in the direction of a main surface of the outer panel.

In one aspect of the present disclosure, the coupling portion of the decoration member may be inserted through the opening and project beyond the back side of the outer panel. The bracket may have a cover portion coupled to the coupling portion so as to cover the coupling portion, the holding portion formed at an outer peripheral edge of the cover portion, and a reinforcing rib formed in a recessed corner that is formed in the cover portion and the holding portion.

With this configuration, the reinforcing rib is formed in the recessed corner that is formed in the cover portion and the holding portion of the bracket. This improves rigidity of the holding portion of the bracket. The outer panel is thus firmly fixed between the bracket and the decoration member.

In one aspect of the present disclosure, the bracket may have a drain groove in its inner peripheral surface. The drain groove may extend in both the cover portion and the holding portion, open in a tip end of the holding portion, and project toward outside of the bracket to form the reinforcing rib.

With this configuration, since the bracket has the drain groove in its inner peripheral surface, water (e.g., water drops) having entered the bracket is effectively drained to the outside of the bracket. Since the drain groove forms the reinforcing rib, the drain groove can also be used as the reinforcing rib.

In one aspect of the present disclosure, the bracket may be placed over the decoration member other than a part of the decoration member which is mounted on the outer panel.

With this configuration, the bracket is placed over the decoration member other than the part of the decoration member which is mounted on the outer panel. Accordingly, the portion of the outer panel which is held between the bracket and the decoration member does not overlap the part of the decoration member which is mounted on the outer panel. This allows the entire decoration member to have uniform mounting rigidity on the outer panel. Since the bracket is not placed on the entire back side of the decoration member, reduction in size of the bracket is achieved.

In one aspect of the present disclosure, the decoration member may be a mascot having substantially the same lateral width as that of the door handle, and the door handle may have an electric door switch.

With this configuration, the mascot (i.e., a relatively narrow decoration member) can be fixed with high rigidity to the outer panel. Moreover, the door handle has an electric door switch, which contributes to reduction in size of the mascot.

The present disclosure thus provides a vehicle door handle mounting structure capable of providing sufficient mounting rigidity of a decoration member on a vehicle door even if the decoration member is a narrow member.

DETAILED DESCRIPTION

An embodiment of the present disclosure will be described with reference to FIGS. 1 to 14.

SUMMARY

Figure 1:
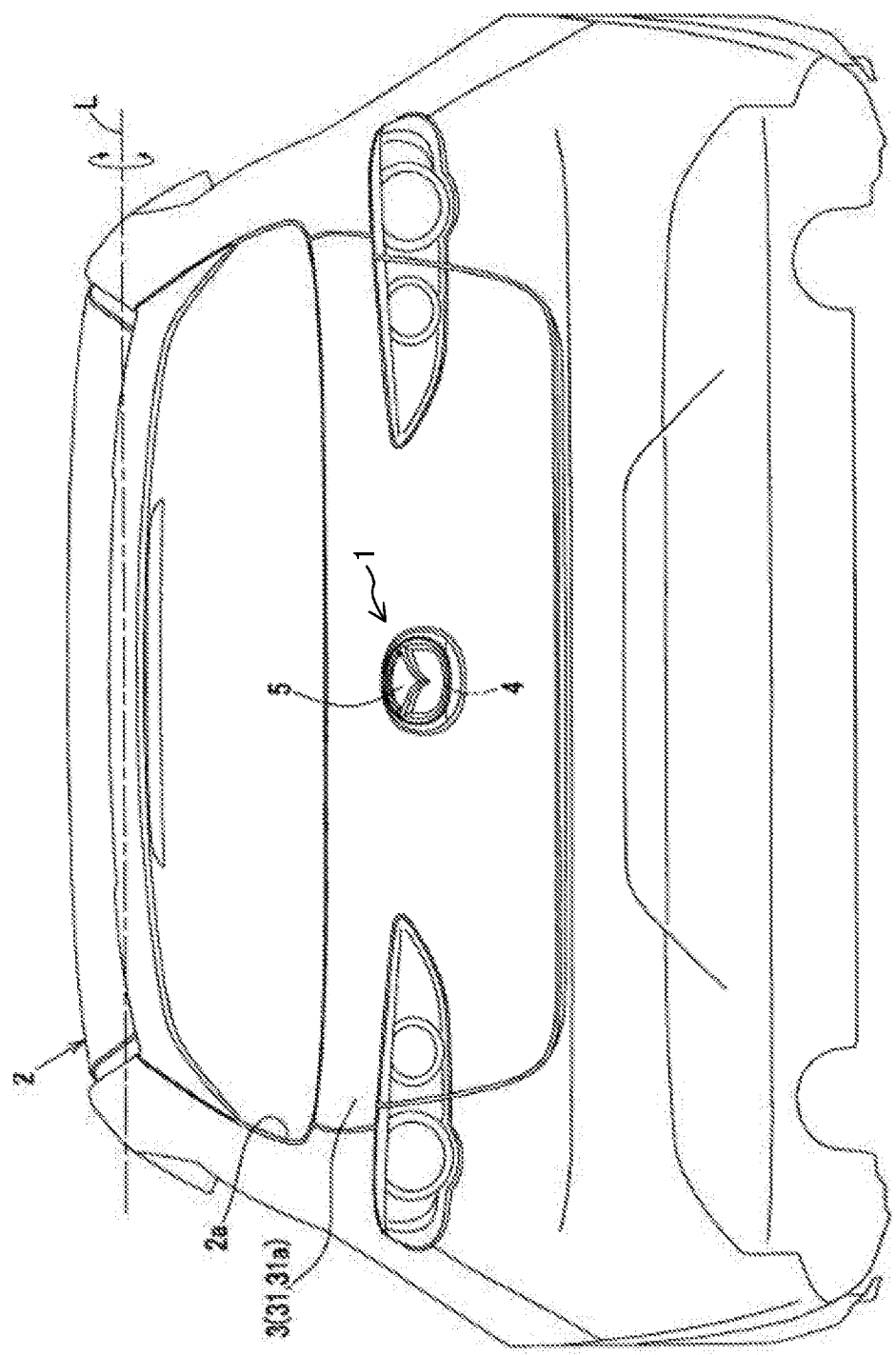
FIG. 1 is a front view of a rear part of a vehicle to which a vehicle door handle mounting structure according to an embodiment of the present disclosure has been applied.
Figure 2:
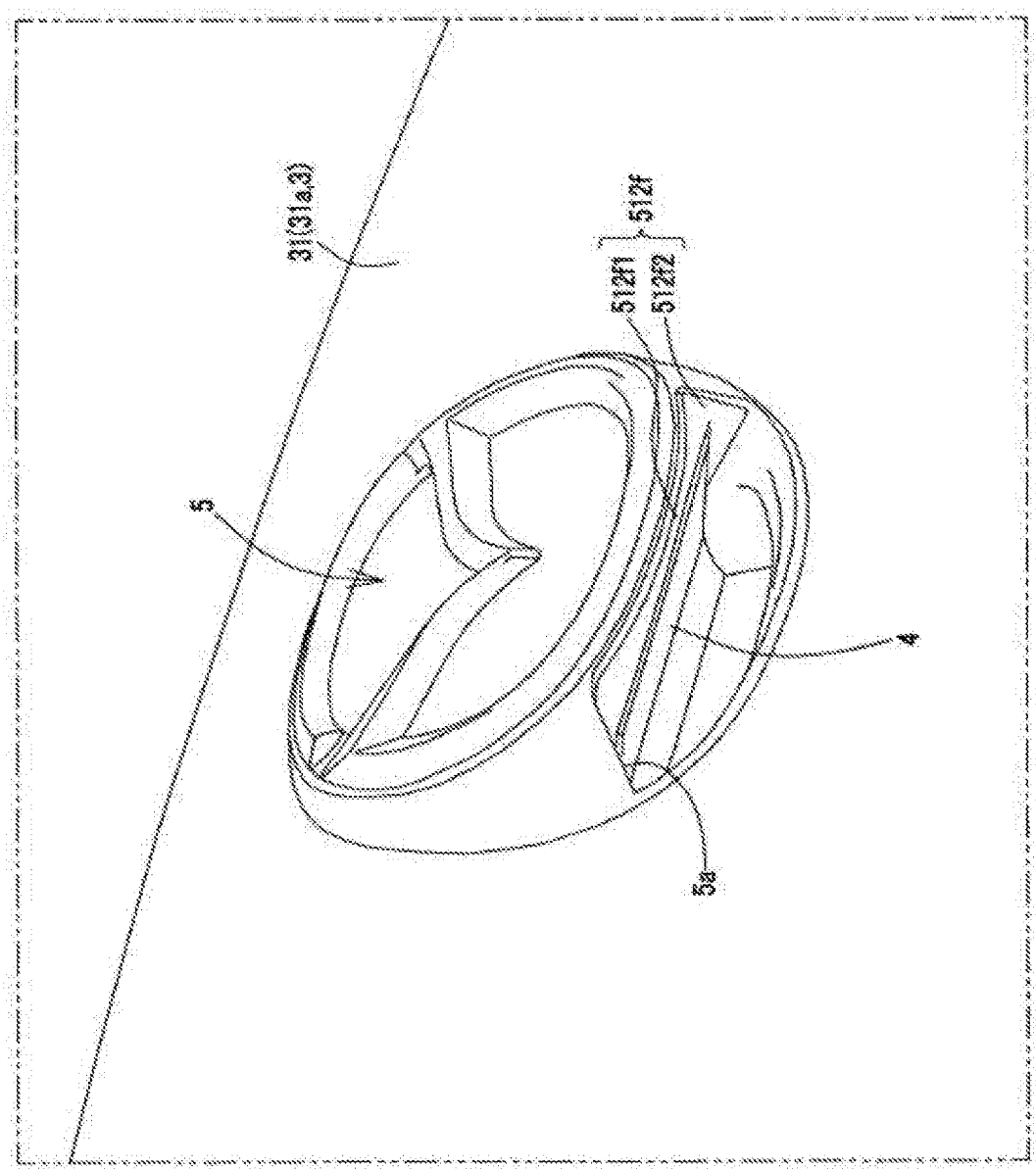
FIG. 2 is a perspective view of a decoration member mounted on the outer surface of a vehicle door as viewed from below.
Figure 3A:
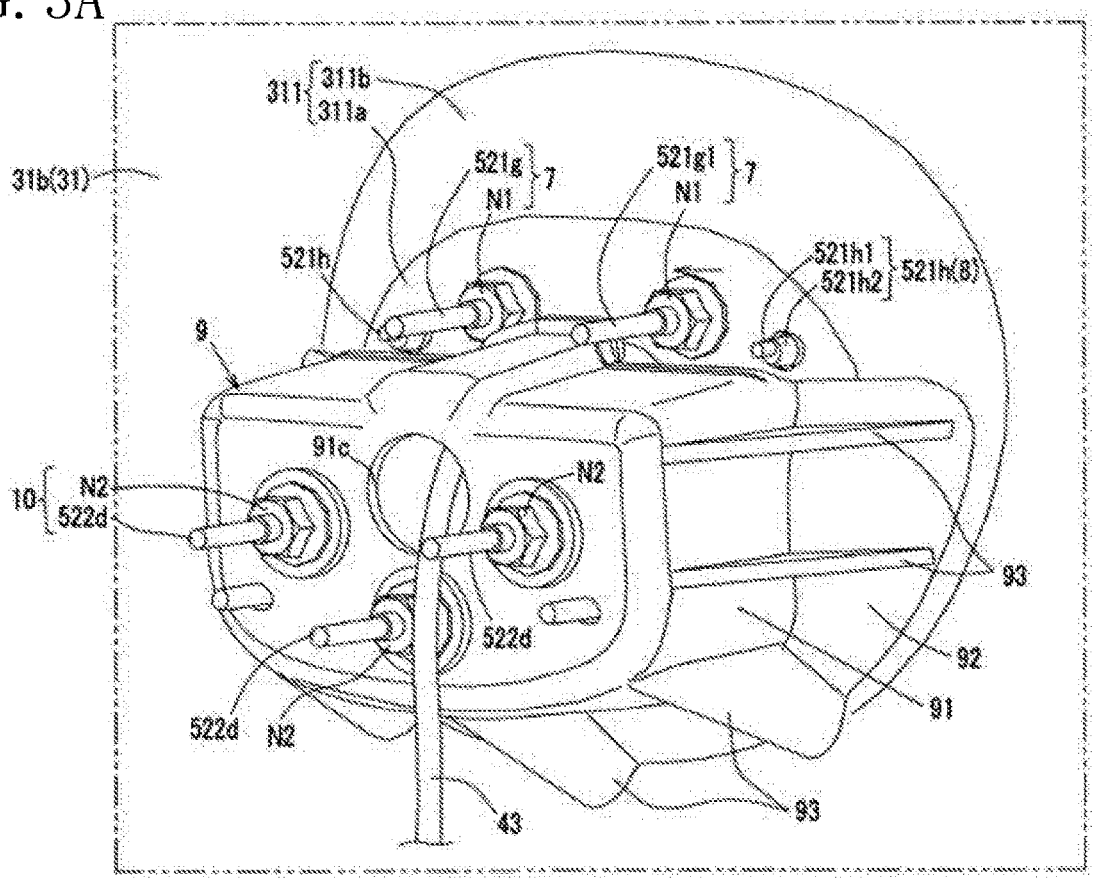
FIG. 3A is a perspective view of the vehicle door handle mounting structure as viewed from the back side of an outer panel.
Figure 3B:
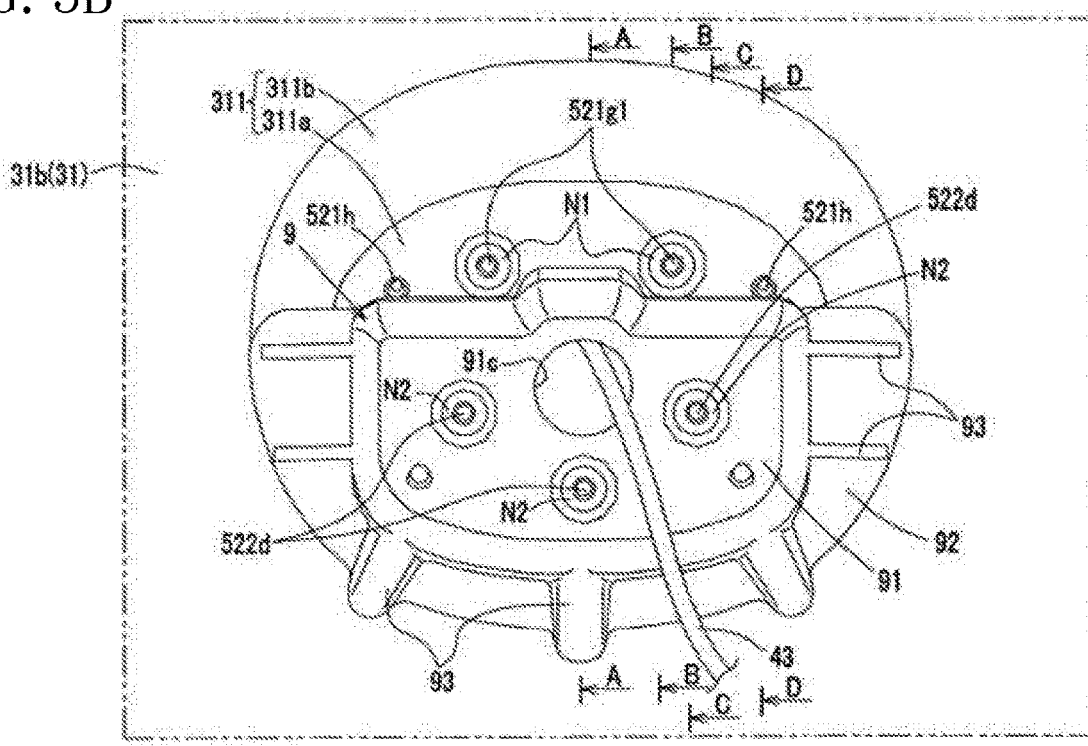
FIG. 3B is a front view of the vehicle door handle mounting structure as viewed from the back side of the outer panel.

FIG. 1 is a front view of a rear part of a vehicle 2 to which a vehicle door handle mounting structure 1 according to the embodiment has been applied. FIG. 2 is a perspective view of a decoration member 5 mounted on the outer surface of a vehicle door (e.g., back door) 3 as viewed from below. FIGS. 3A and 3B are a perspective view and a front view, respectively, of the vehicle door handle mounting structure 1 as viewed from the back side of an outer panel 31.

As shown in FIG. 1, the vehicle door handle mounting structure 1 has been applied to a door handle 4 of the vehicle door 3 that opens and closes a trunk opening 2a at the back of the vehicle 2. The door handle 4 also serves as the decoration member 5 mounted on the outer surface of the vehicle door 3.

More specifically, the vehicle 2 is, e.g., a wagon or a hatchback. The vehicle 2 has a trunk at the back. The vehicle 2 also has the trunk opening 2a and the vehicle door 3 at the back. The trunk opening 2a communicates with the trunk and the vehicle door 3 opens and closes the trunk opening 2a. The vehicle door 3 is, e.g., a hatch-type door. The upper side portion of the vehicle door 3 is swingably hinged to the upper side portion of the trunk opening 2a so that the vehicle door 3 can swing upward and downward about near its upper side portion as a rotation axis L.

The vehicle door 3 includes the outer panel 31 that forms the outer surface of the vehicle door 3. The decoration member 5 is mounted on the outer surface of the outer panel 31. The decoration member 5 is, e.g., a mascot with a logo etc. thereon (i.e., a relatively narrow decoration member). For example, the decoration member 5 has a laterally long elliptical shape as viewed from the front, is somewhat thick, and projects from the outer surface of the outer panel 31.

As shown in FIG. 2, the decoration member 5 has an accommodating space therein, and the door handle 4 that is operated to open and close the vehicle door 3 is accommodated in the accommodating space. The decoration member 5 has an opening 5a at its lower end, which communicates with the accommodating space. The user can unlock the vehicle door 3 by inserting his/her finger(s) into the inside of the decoration member 5 through the opening 5a at the lower end of the decoration member 5 and operating the door handle 4. The user can open the vehicle door 3 by holding the decoration member 5 and swinging the vehicle door 3 upward.

As shown in FIGS. 3A and 3B, the decoration member 5 is fixed to the outer panel 31 by fixing parts 7 (e.g., fixing bolts 521g and nuts N1) and fixing parts 8 (e.g., fixing pins 521h). A bracket 9 is disposed on the back side of the decoration member 5 with the outer panel 31 interposed therebetween. The bracket 9 is coupled to the decoration member 5 with the outer panel 31 interposed therebetween by coupling parts 10 (e.g., coupling bolts 522d and nuts N2). The outer panel 31 is held between the decoration member 5 and the bracket 9 by this coupling, and the decoration member 5 is further fixed to the outer panel 31 by this holding.

Detailed Configuration

Figure 4:
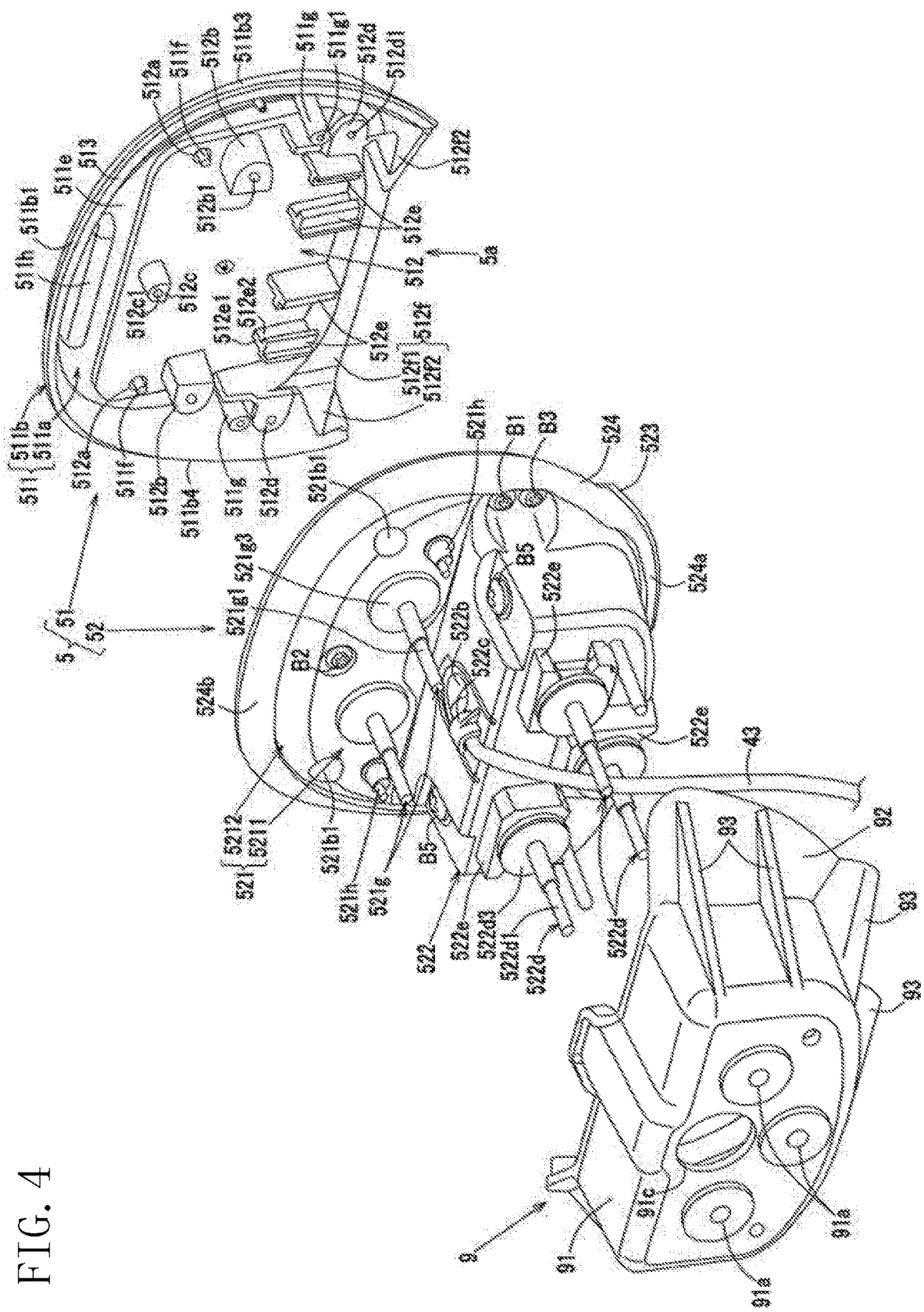
FIG. 4 is an exploded perspective view of the vehicle door handle mounting structure as viewed from the rear.
Figure 5:
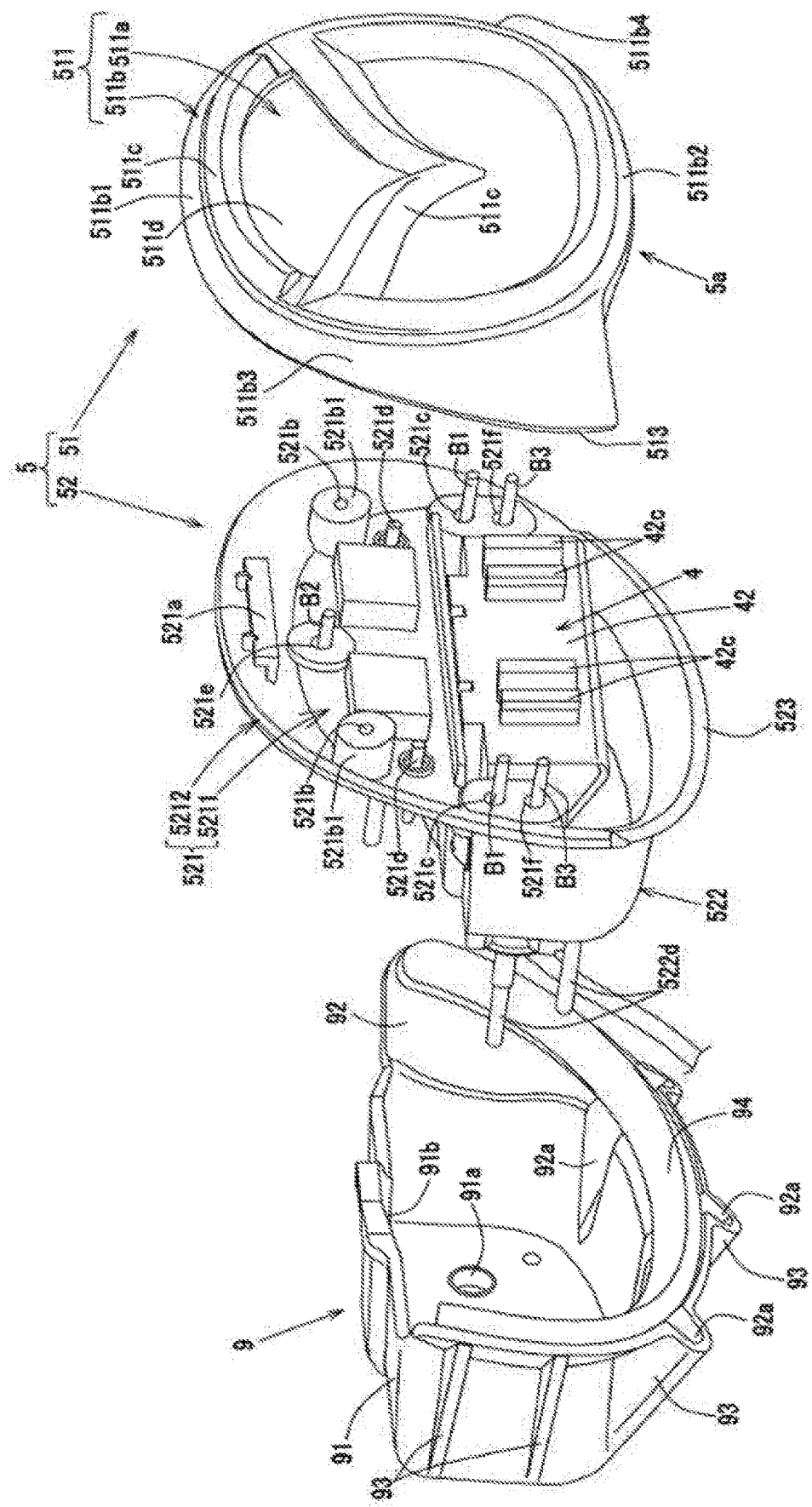
FIG. 5 is an exploded perspective view of the vehicle door handle mounting structure as viewed from the front.
Figure 6A:
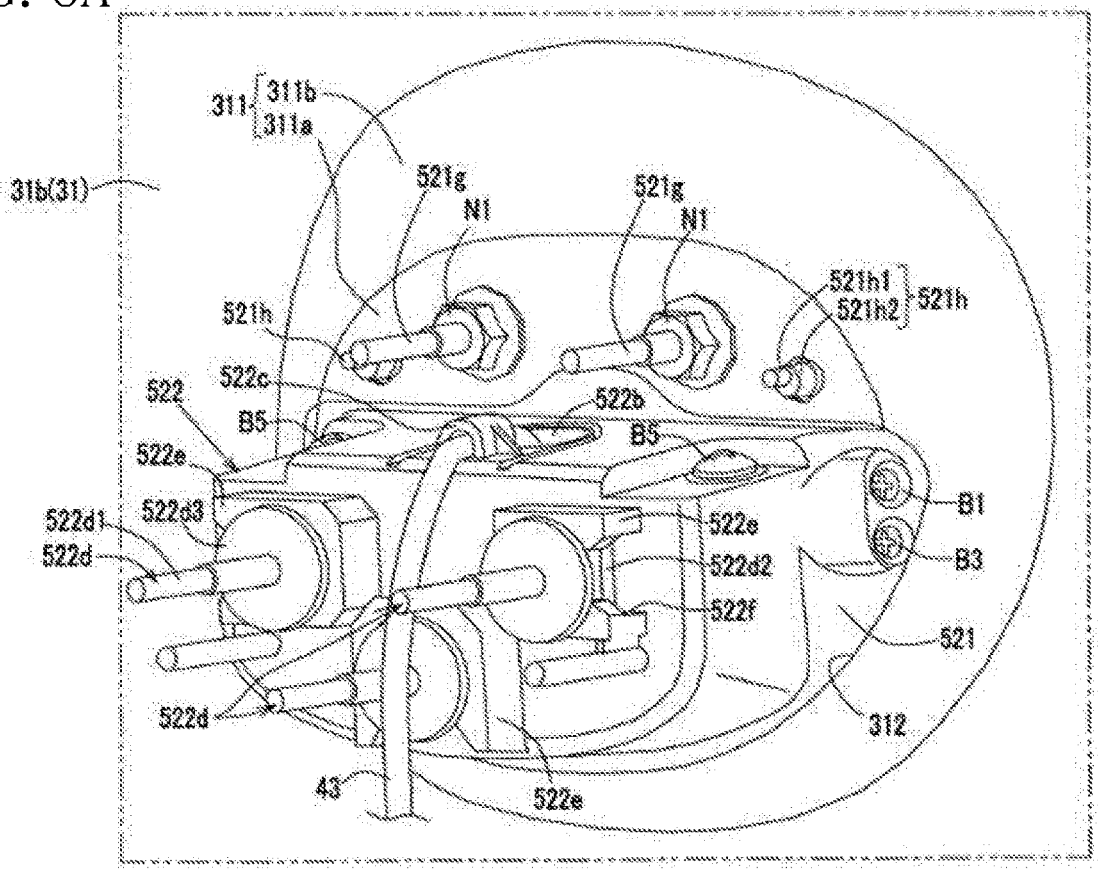
FIG. 6A is a perspective view of the decoration member placed in an opening of the outer panel as viewed from the back side of the outer panel.
Figure 6B:
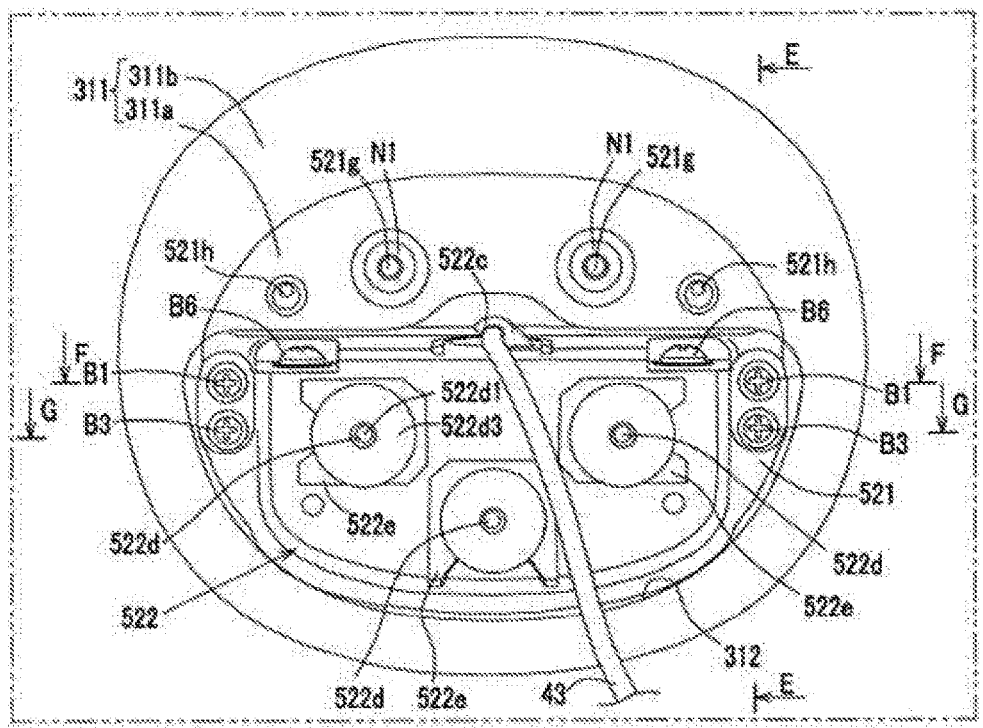
FIG. 6B is a front view of the decoration member placed in the opening of the outer panel as viewed from the back side of the outer panel.
Figure 7:
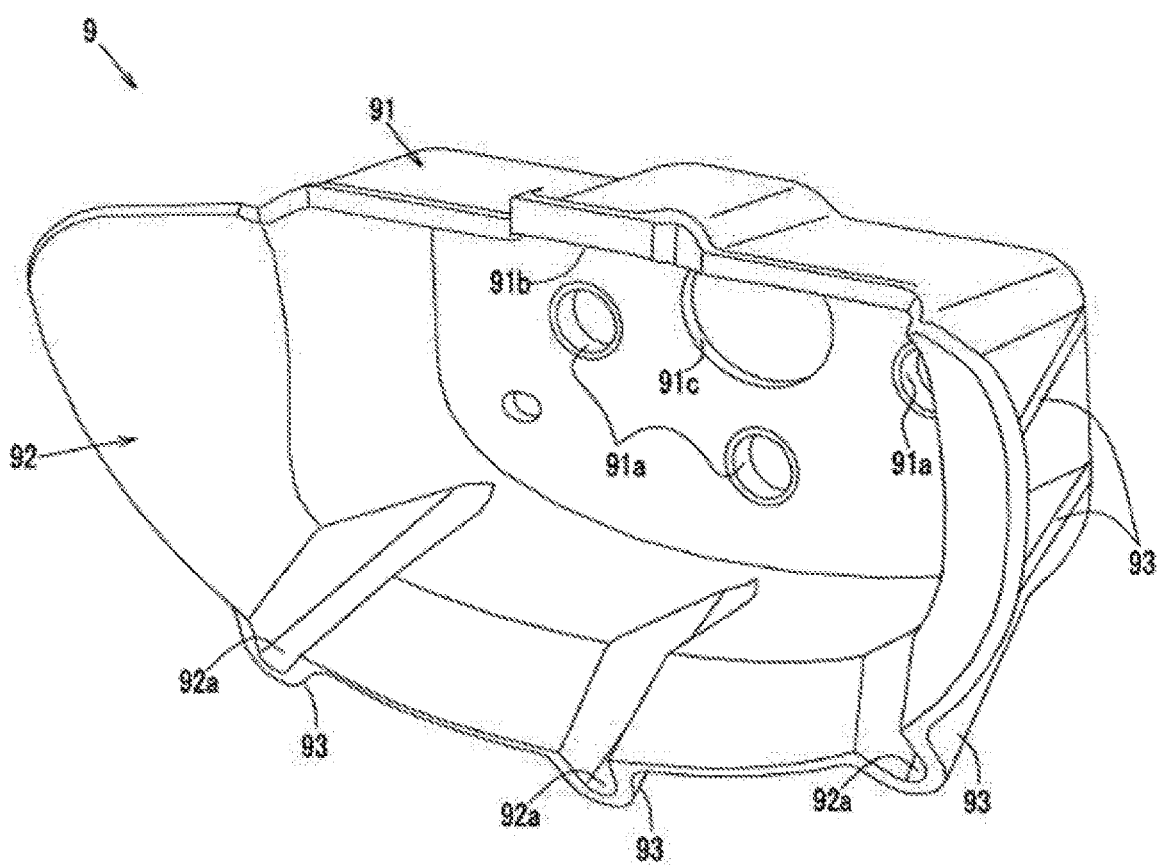
FIG. 7 is a perspective view of a bracket as viewed from the front (front side).
Figure 12:
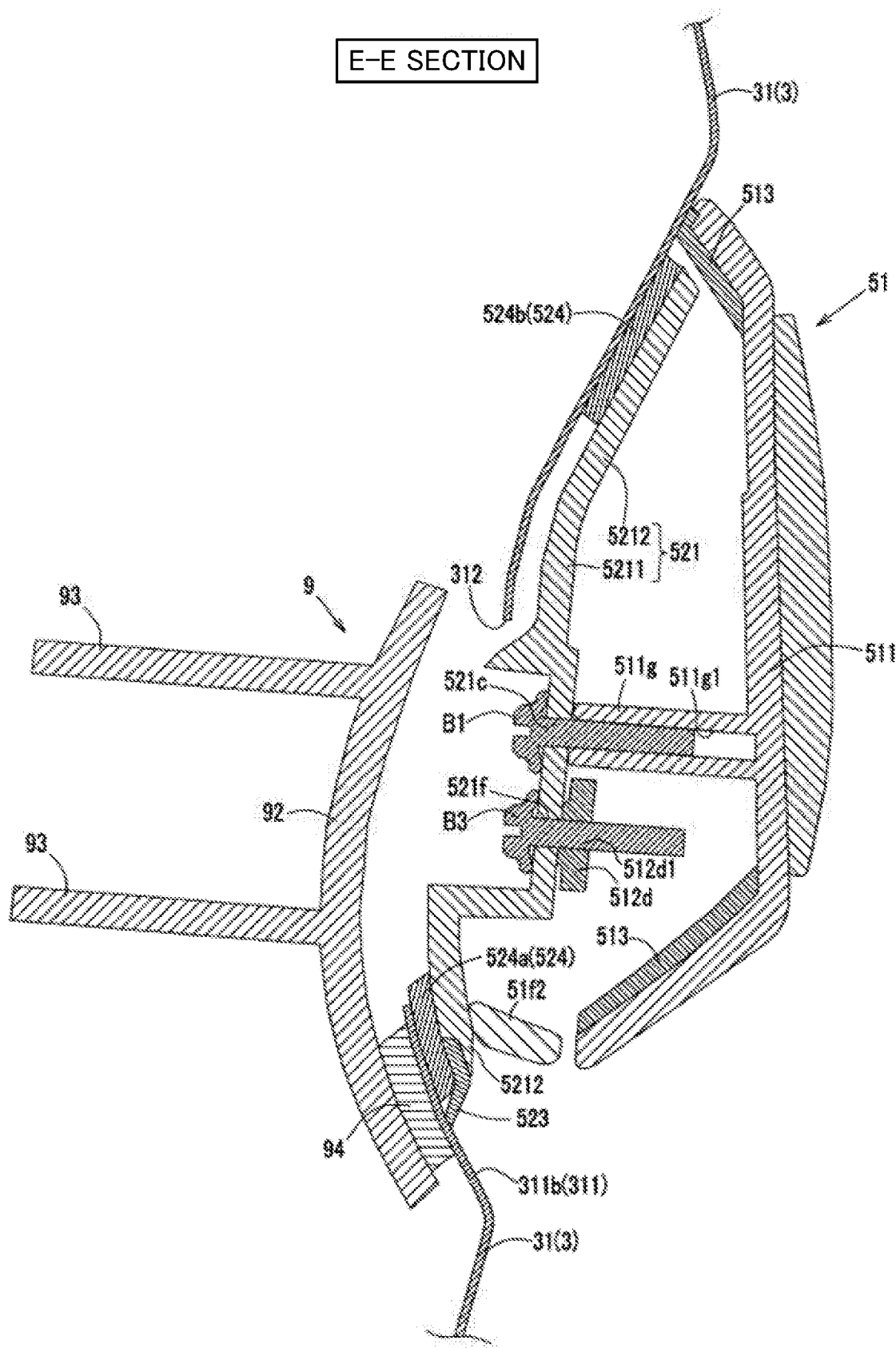
FIG. 12 is a sectional view taken along line E-E in FIG. 6B.
Figure 13:
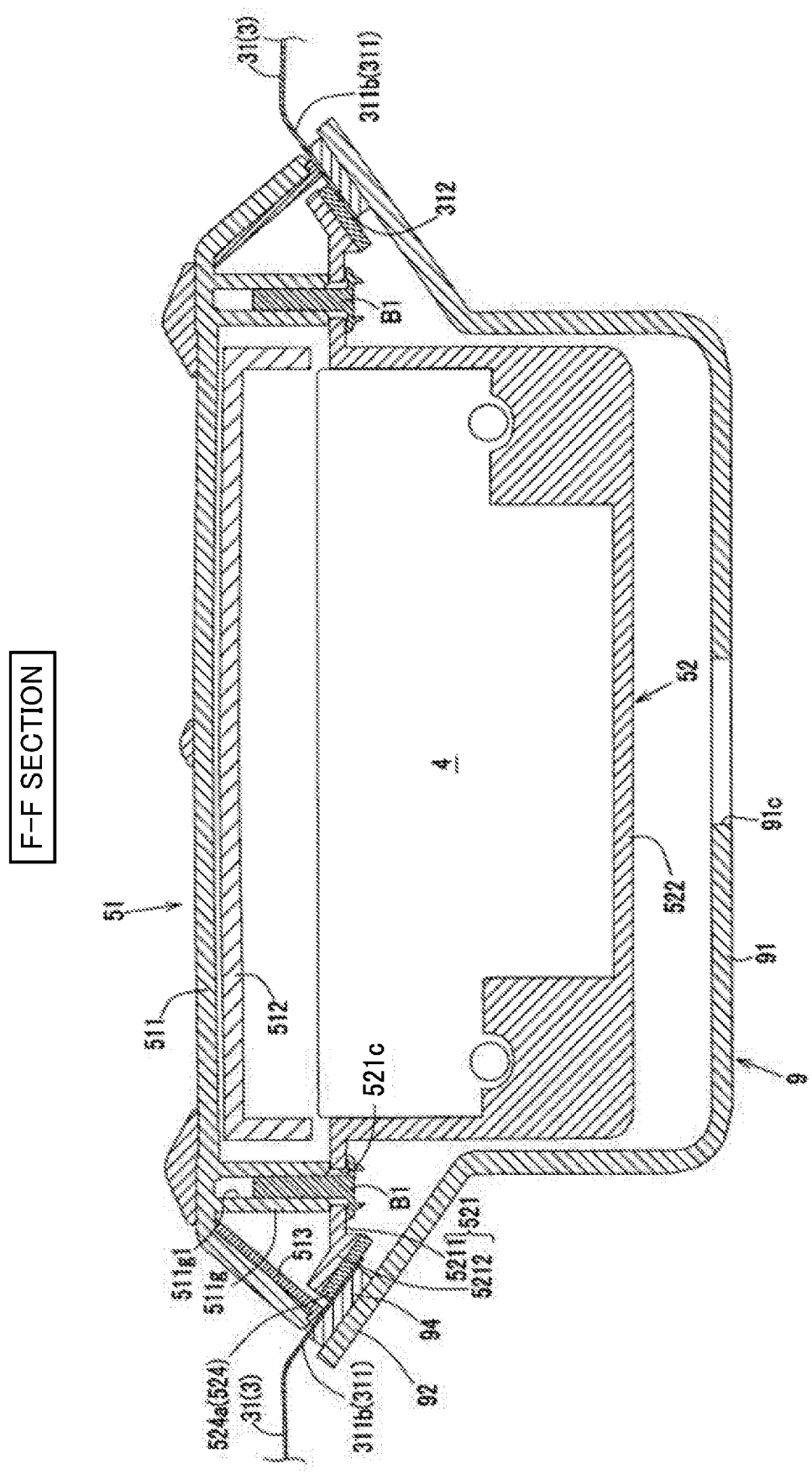
FIG. 13 is a sectional view taken along line F-F in FIG. 6B.
Figure 14:
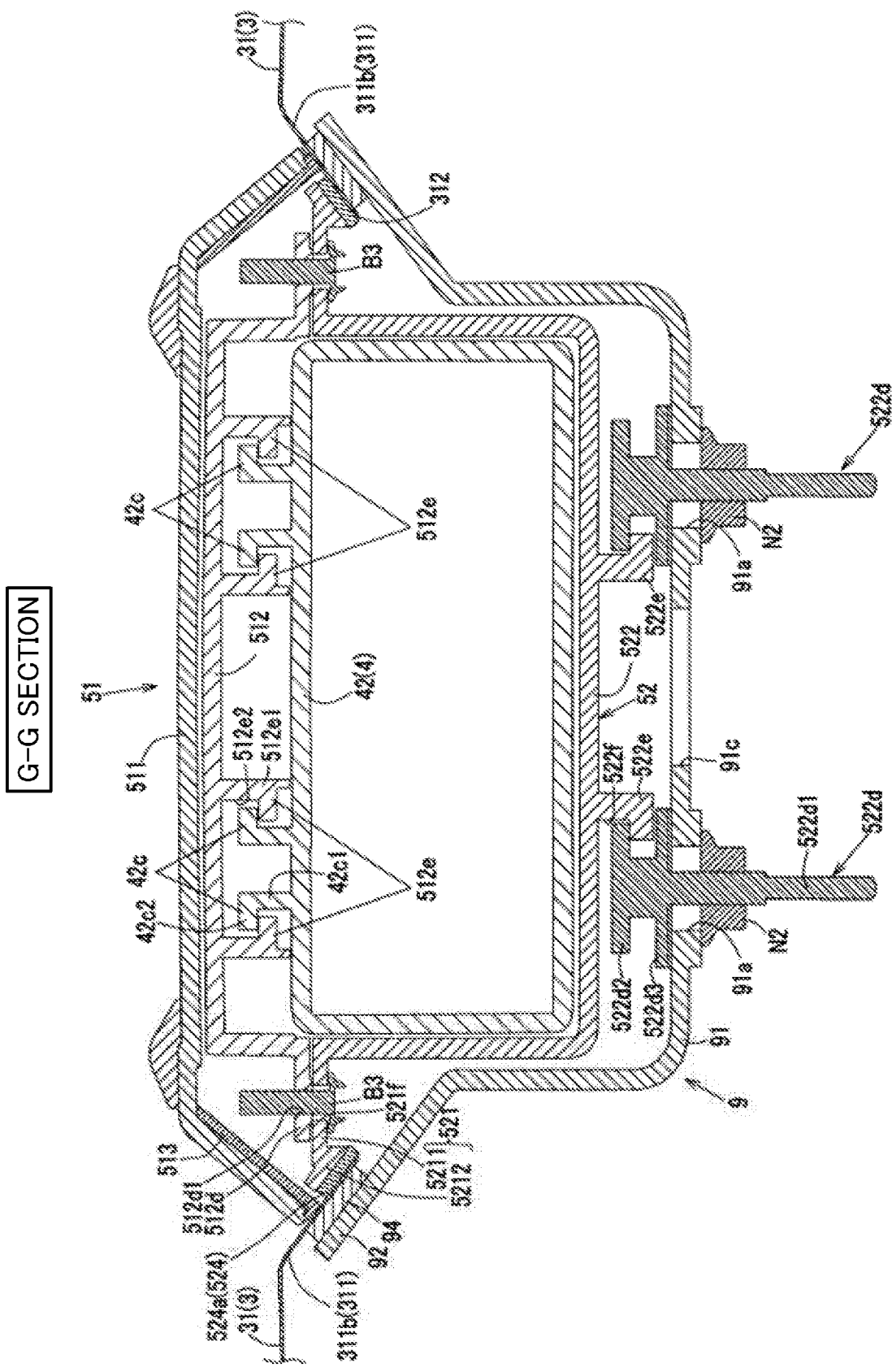
FIG. 14 is a sectional view taken along line G-G in FIG. 6B.

The vehicle door handle mounting structure 1 (i.e., the outer panel 31, the decoration member 5, the bracket 9, and the door handle 4) will be described in detail with reference to FIGS. 3A to 14. FIGS. 4 and 5 are exploded perspective views of the vehicle door handle mounting structure 1 as viewed from the rear and the front, respectively. FIGS. 6A and 6B are a perspective view and a front view, respectively, of the decoration member 5 disposed in an opening 312 of the outer panel 31 as viewed from the back side of the outer panel 31. FIG. 7 is a perspective view of the bracket 9 as viewed from the front (i.e., the front side). FIGS. 8 to 11 are sectional views taken along lines A-A, B-B, C-C, and D-D in FIG. 3B, respectively. FIGS. 12 to 14 are sectional views taken along lines E-E, F-F, and G-G in FIG. 6B, respectively.

Outer Panel 31

Figure 11:
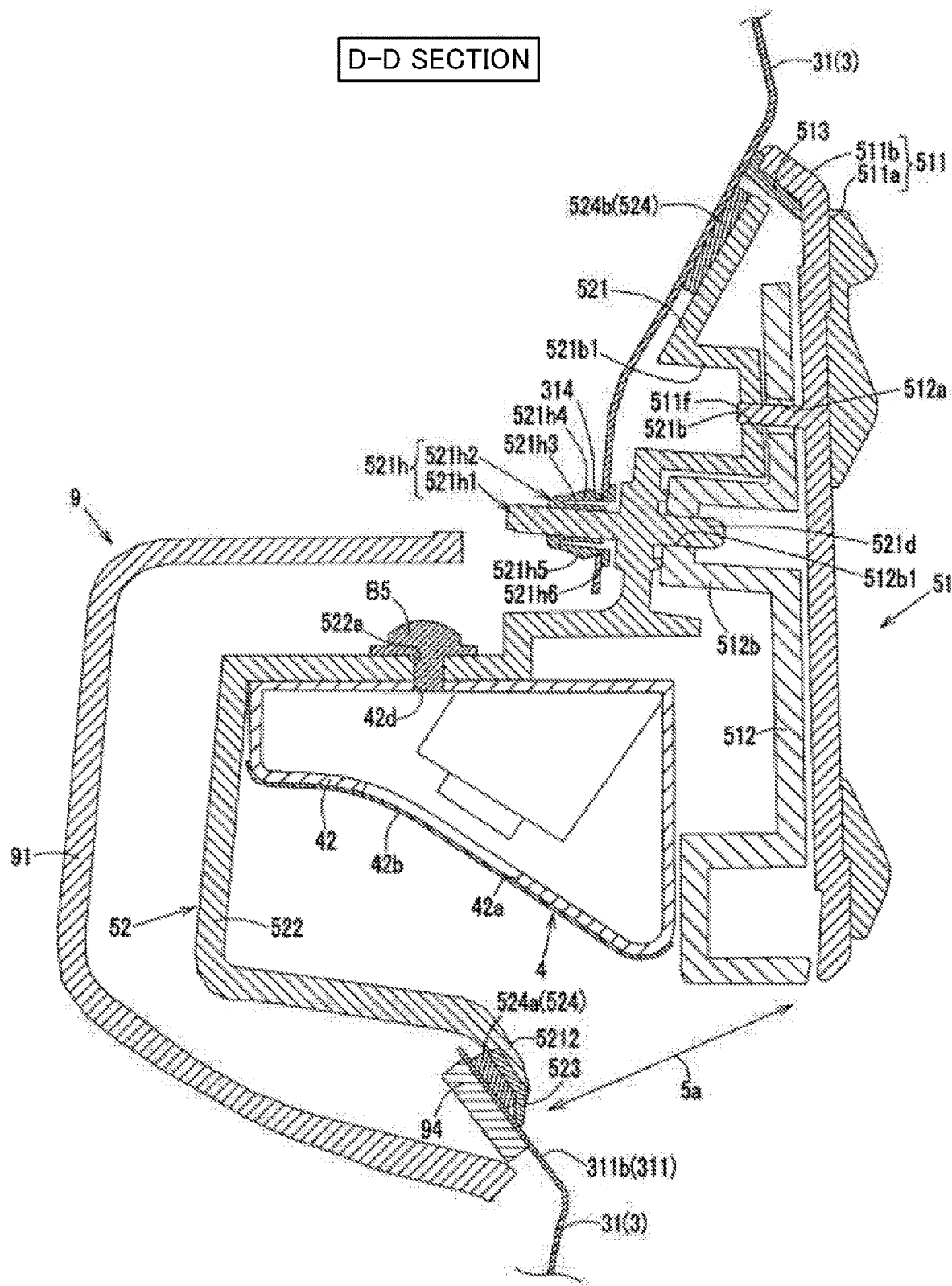
FIG. 11 is a sectional view taken along line D-D in FIG. 3B.

As shown in FIGS. 6A, 6B, and 13, the outer panel 31 has a stepped recessed portion 311, an opening 312, and through holes 313 (see FIG. 9), 314 (see FIG. 11). The decoration member 5 is mounted on the stepped recessed portion 311, a housing 52, described below, of the decoration member 5 is disposed in the opening 312, and the fixing parts 7, 8 for fixing the decoration member 5 are inserted through the through holes 313, 314.

The outer contour of the stepped recessed portion 311 is the same in shape and size (e.g., a substantially elliptical shape as viewed from the front) as the outer contour of a decoration member body 51, described below, of the decoration member 5. The stepped recessed portion 311 is recessed as viewed from an outer surface 31a of the outer panel 31 and protrudes as viewed from a back surface 31b of the outer panel 31.

The stepped recessed portion 311 includes a flat bottom wall 311a and a stepped peripheral wall 311b. The stepped peripheral wall 311b stands from the entire outer peripheral edge of the bottom wall 311a.

For example, the bottom wall 311a has a substantially elliptical shape, and the stepped peripheral wall 311b has a substantially elliptical ring shape and is tilted so that its tip end (i.e., the end on the front side of the outer panel 31) is located more outside in the radial direction than its base end is.

The bottom wall 311a has in its lower half the opening 312 where a coupling portion 522, described below, of the decoration member 5 is disposed. For example, the opening 312 opens in the entire lower half of the bottom wall 311a. The bottom wall 311a has in its upper half the through holes 313, 314 for fixing the decoration member 5. For example, the bottom wall 311a has two through holes 313 and two through holes 314. The two through holes 313 are formed next to each other near the middle part in the lateral direction of the upper half of the bottom wall 311a, and the two through holes 314 are formed on both sides in the lateral direction of the upper half of the bottom wall 311a (i.e., on the right and left sides of the two through holes 313), one on each side.

As shown in FIGS. 4 and 5, the vehicle door handle mounting structure 1 includes the decoration member 5, the bracket 9, and the door handle 4. As described above, the decoration member 5 is mounted on the front side of the stepped recessed portion 311 of the outer panel 31. The bracket 9 is coupled to the decoration member 5 from the back side of the outer panel 31 and together with the decoration member 5 holds the outer panel 31 therebetween. The door handle 4 is mounted in the decoration member 5. The decoration member 5 and the bracket 9 are made of, e.g., resin (plastic etc.).

Decoration Member 5

As shown in FIGS. 4 and 5, the decoration member 5 includes the decoration member body 51 with a logo etc. thereon, and the housing 52 accommodating the door handle 4.

Decoration Member Body 51

As shown in FIGS. 4 and 5, the decoration member body 51 includes an outer case 511, a fixing base 512, and an elastic member 513. The door handle 4 and the housing 52 are fixed to the fixing base 512, and the elastic member 513 is disposed in the clearance between the outer case 511 and the outer panel 31.

For example, the outer case 511 has a shallow plate shape that is substantially elliptical as viewed from the front. The outer case 511 includes a bottom wall 511a and an outer peripheral wall 511b that stands from the outer peripheral edge of the bottom wall 511a toward the back side of the bottom wall 511a.

For example, the bottom wall 511a has a plate shape that is substantially elliptical as viewed from the front. The bottom wall 511a has a logo 511c on its outer surface 511d (see FIG. 5). For example, the logo 511c is mounted so as to project from the outer surface 511d of the bottom wall 511a. For example, the logo 511c is a separate member (e.g., resin or metal) from the bottom wall 511a and is fixed to the bottom wall 511a from the back side of the bottom wall 511a by screws or is fixed to the bottom wall 511a by an adhesive.

The bottom wall 511a has on its back surface 511e positioning projections 511f for positioning the fixing base 512 and the housing 52, fixing bosses 511g for fixing the housing 52, and an engaged portion 511h that is engaged by an engaging portion 521a, described below, of the housing 52 (see FIG. 4).

For example, the positioning projections 511f have a bar shape and stand on the right and left sides of the upper part of the bottom wall 511a (see FIG. 11). For example, the fixing bosses 511g have a cylindrical shape and have in their tip end faces a hole 511g1 into which a screw B1 for fixing the housing 52 is screwed (see FIG. 12). For example, the fixing bosses 511g stand on the right and left sides of the middle part in the vertical direction of the bottom wall 511a. The engaged portion 511h has a laterally long box shape that opens in its lower surface. The engaged portion 511h is formed on the bottom wall 511a such that the side surface of the engaged portion 511h which is located on the rear side of the vehicle is integral with the bottom wall 511a (see FIG. 8).

The outer peripheral wall 511b is tilted so that its tip end is located more outside in the radial direction than its base end (i.e., the end on the bottom wall 511a side) is. An upper peripheral wall 511b1, a lower peripheral wall 511b2, a left peripheral wall 511b3, and a right peripheral wall 511b4 are connected in a ring shape to form the outer peripheral wall 511*b*. The upper peripheral wall 511*b*1 has a relatively small height (length in the direction from the tip end to the base end of the upper peripheral wall 511*b*), and the lower peripheral wall 511*b*2 has a relatively large height. The heights of the left peripheral wall 511*b*3 and the right peripheral wall 511*b*4 increase gradually so that the height on the lower peripheral wall 511*b*2 side is larger than that on the upper peripheral wall 511*b*1 side (see FIG. 5).

The lower peripheral wall 511*b*2 has the opening 5*a*. For example, the opening 5*a* is formed in substantially the entire lower peripheral wall 511*b*2 and has a laterally long rectangular shape (see FIG. 2). Since the lower peripheral wall 511*b*2 has a relatively large height as described above, the opening 5*a* has a sufficiently large size (that is, such a size that the user can easily insert his/her finger(s) into the opening 5*a* when operating the door handle 4 to open the vehicle door 3, and can easily hold the peripheral edge of the opening 5*a* when opening the vehicle door 3).

For example, the fixing base 512 has a plate shape that is substantially rectangular as viewed in plan, and has approximately such a size that the fixing base 512 is inscribed in the contour of the bottom wall 511*a* of the outer case 511. The fixing base 512 is fixed to the bottom wall 511*a* by screws or an adhesive such that the back side of the fixing base 512 faces the back side of the bottom wall 511*a* of the outer case 511. The lower end of the fixing base 512 extends to a position near the lower end of the bottom wall 511*a* of the outer case 511 (i.e., near the upper end of the opening 5*a*).

The fixing base 512 has through holes 512*a* for positioning the outer case 511, positioning bosses 512*b* for positioning the housing 52, a fixing boss 512*c* for fixing the housing 52, fixing pieces 512*d* for fixing the housing 52, fixing retaining portions 512*e* for fixing the door handle 4, and a clearance filling wall 512*f* for filling the clearance between the door handle 4 and the opening 5*a* of the outer case 511 (see FIG. 4).

For example, the through holes 512*a* are formed on the right and left sides of the upper part of the fixing base 512 (i.e., at positions corresponding to the positioning projections 511*f*) so as to extend through the fixing base 512 (see FIG. 11). The positioning projections 511*f* of the outer case 511 are loosely fitted in the through holes 512*a*, whereby the outer case 511 and the fixing base 512 are roughly positioned relative to each other.

For example, the positioning bosses 512*b* have a substantially semicircular cylinder shape and stand on the right and left sides of the middle part in the vertical direction of the surface of the fixing base 152 (e.g., below the through holes 512*a*) (see FIG. 11). The positioning bosses 512*b* have a hole 512*b*1 in their tip end faces. Positioning projections 521*d*, described below, of the housing 52 are fittingly inserted through the holes 512*b*1. The fixing base 512 and the housing 52 are thus positioned relative to each other.

Figure 8:
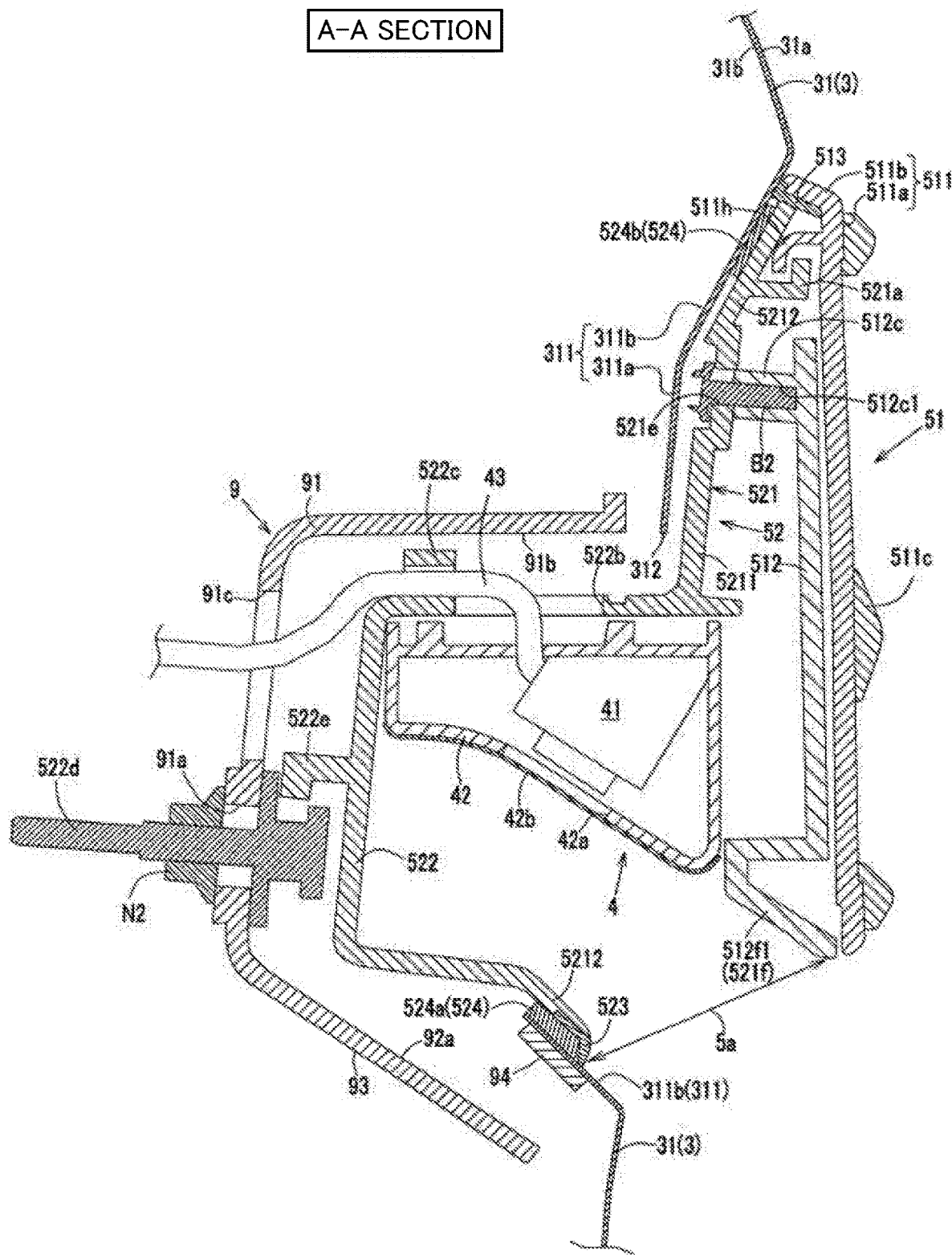
FIG. 8 is a sectional view taken along line A-A in FIG. 3B.
Figure 9:
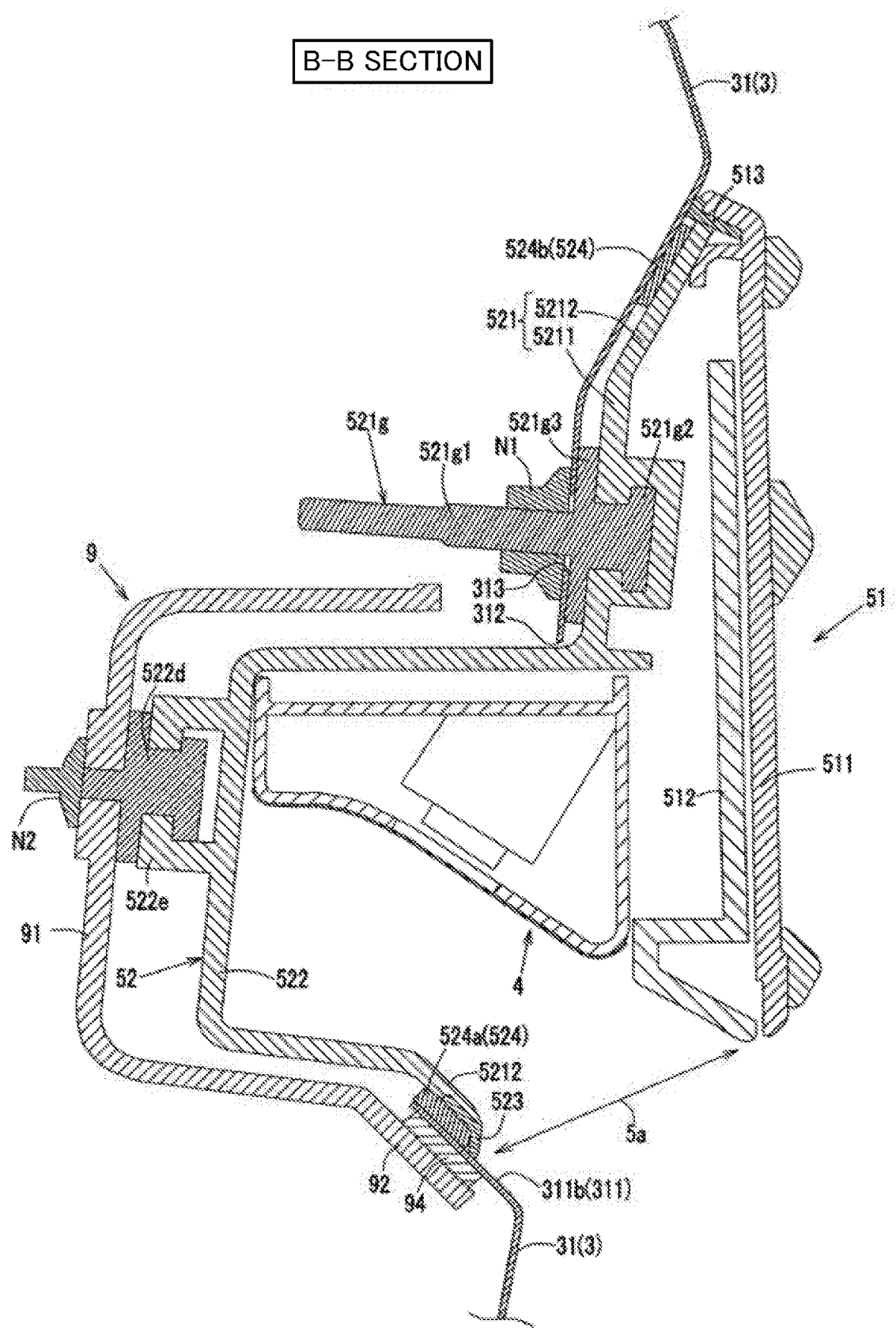
FIG. 9 is a sectional view taken along line B-B in FIG. 3B.

For example, the fixing boss 512*c* has a substantially semicircular cylinder shape and stands in the middle part in the lateral direction of the upper part of the surface of the fixing base 512 (see FIG. 8). The fixing boss 512*c* has a hole 512*c*1 in its tip end face so that a screw B2 for fixing the housing 52 is screwed therein.

For example, the fixing pieces 512*d* stand from the right and left sides of the lower part of the surface of the fixing base 512 toward the front side of the surface of the fixing piece 512*d*, and are bent so that the halves on the tip end side of the fixing pieces 512*d* project toward the right and left sides of the fixing base 512 (see FIG. 14). For example, the halves on the tip end side of the fixing pieces 512*d* are disposed below the fixing bosses 511*g* of the outer case 511 (see FIG. 12). The halves on the tip end side of the fixing pieces 512*d* have a hole 512*d*1 so that a screw B3 for fixing the housing 52 is screwed therethrough.

For example, two fixing retaining portions 512*e* are formed next to each other in the lateral direction on the lower part of the surface of the fixing base 512. Each fixing retaining portion 512*e* has a pair of retaining walls 512*e*1 standing on the surface of the fixing base 512 (see FIG. 14). The retaining walls 512*e*1 extend in the vertical direction and are separated from each other. Retaining grooves 512*e*2 that retain a stopper portion 42*c*, described below, of the door handle 4 are formed in the opposing side surfaces of the retaining walls 512*e*1. Each retaining groove 512*e*2 extends in the vertical direction and opens in the upper end face of the retaining wall 512*e*1. The stopper portion 42*c* of the door handle 4 is inserted into the retaining grooves 512*e*2 from above the pair of retaining walls 512*e*1, whereby the door handle 4 is fixed to the fixing base 512.

The clearance filling wall 512*f* has a middle wall 512*f*1 and right and left side walls 512*f*2. The middle wall 512*f*1 stands on the lower end of the surface of the fixing base 512, and the right and left side walls 512*f*2 project from the middle wall 512*f* to the right and left sides. The middle wall 512*f*1 fills the clearance between the upper side of the opening 5*a* of the outer case 511 and the door handle 4 (see FIG. 8). The right and left side walls 512*f*2 fill the clearances between the right and left sides of the opening 5*a* and the door handle 4 (see FIG. 2).

The elastic member 513 covers the inner peripheral surface of the outer peripheral wall 511*b* and covers the tip end face of the outer peripheral wall 511*b* (see FIGS. 8 and 13). The tip end (i.e., a portion that covers the tip end face of the outer peripheral wall 511*b*) of the elastic member 513 contacts the outer surface of the outer panel 31. This contact restrains water from the outside from entering a vehicle body through the opening 312 of the outer panel 31. The elastic member 513 extends along the inner half of the tip end face of the outer peripheral wall 511*b* in the thickness direction of the outer peripheral wall 511*b*. This makes it difficult for the elastic member 513 to be seen from the outside of the decoration member 5.

Housing 52

As shown in FIGS. 4 and 5, the housing 52 has a back-side case portion 521, an accommodating recess 522, and a rubber elastic member 523, and a urethane elastic member 524. The back-side case portion 521 is fixed to the back side of the decoration member body 51. The accommodating recess 522 is formed in the back-side case portion 521 and accommodates the door handle 4.

The back-side case portion 521 has a shallow plate shape whose outer contour is substantially the same in shape and size as the outer contour of the decoration member body 51. The back-side case portion 521 is shaped so that it can be fitted in the stepped recessed portion 311 of the outer panel 31. The back-side case portion 521 includes a bottom wall 5211 and an outer peripheral wall 5212 that stands form the outer peripheral edge of the bottom wall 5211 toward the decoration member body 51. The bottom wall 5211 is a portion that is fitted on the bottom wall 311*a* of the stepped recessed portion 311, and the outer peripheral wall 5212 is a portion that is fitted on the stepped peripheral wall 311*b* of the stepped recessed portion 311.

The bottom wall 5211 has a plate shape (e.g., substantially elliptical as viewed from the front) and is substantially the same in shape and size as the bottom wall 311*a* of the stepped recessed portion 311 of the outer panel 31. The bottom wall 5211 has the accommodating recess 522.

The rubber elastic member 523 has a strip shape and extends along the lower half (i.e., a portion that overlaps the lower half of the opening 312 of the outer panel 31) of the entire circumferential length of the peripheral edge on the tip end side of the outer peripheral surface of the outer peripheral wall 5212. The tip end of the elastic member 523 projects from the tip end of the outer peripheral wall 5212, is tilted outward of the outer peripheral wall 5212, and contacts the surface of the outer panel 31 (see FIG. 8). This contact restrains water from the outside from entering the vehicle body from the clearance between the opening 312 of the outer panel 13 and the housing 52 through the opening 312. The portion of the outer peripheral surface of the outer peripheral wall 5212 on which the elastic member 523 is provided is recessed like a step. The outer peripheral surface of the outer peripheral wall 5212 is thus flush with the outer surface of the elastic member 523.

The urethane elastic member 524 has an endless strip shape and extends along the entire circumferential length of the peripheral edge on the tip end side of the outer peripheral surface of the outer peripheral wall 5212. The elastic member 524 contacts the surface of the outer panel 31 (see FIG. 8). This contact restrains water from the outside from entering the vehicle body from the clearance between the opening 312 of the outer panel 31 and the housing 52 through the opening 312.

A lower half (i.e., a portion that overlaps the lower half of the opening 312) 524a in the circumferential direction of the elastic member 524 is located behind the tip end of the elastic member 523 (see FIG. 8). The pressure of water from the outside is thus reduced by the tip end of the elastic member 523 and the water is almost completely stopped by the lower half 524a of the elastic member 524. An upper half (i.e., a portion that overlaps the upper half of the opening 312) 524b in the circumferential direction of the elastic member 524 is located behind the elastic member 513 of the outer case 511 (see FIG. 8). The pressure of water from the outside is thus reduced by the elastic member 513 and the water is almost completely stopped by the upper half 524b of the elastic member 524. The elastic member 524 also serves as a cushioning material between the housing 52 and the outer panel 31.

The accommodating recess 522 is formed on the lower half of the bottom wall 5211 so as to be recessed from the front side (the decoration member body 51 side) toward the back side (the outer panel 31 side) of the back-side case portion 521, and projects from the back side of the back-side case portion 521. This projecting portion (i.e., the accommodating recess 522) is disposed in the opening 312 of the outer panel 31 and projects beyond the back side of the outer panel 31, and thus serves as a coupling portion to the bracket 9. The accommodating recess 522 is hereinafter also referred to as the coupling portion 522. The accommodating recess 522 is substantially in the shape of a rectangular parallelepiped box that opens in its front surface. The open surface of the accommodating recess 522 is coupled so that the accommodating recess 522 communicates with the back-side case portion 521 in the lower half of the bottom wall 5211 of the back-side case portion 521.

Figure 10:
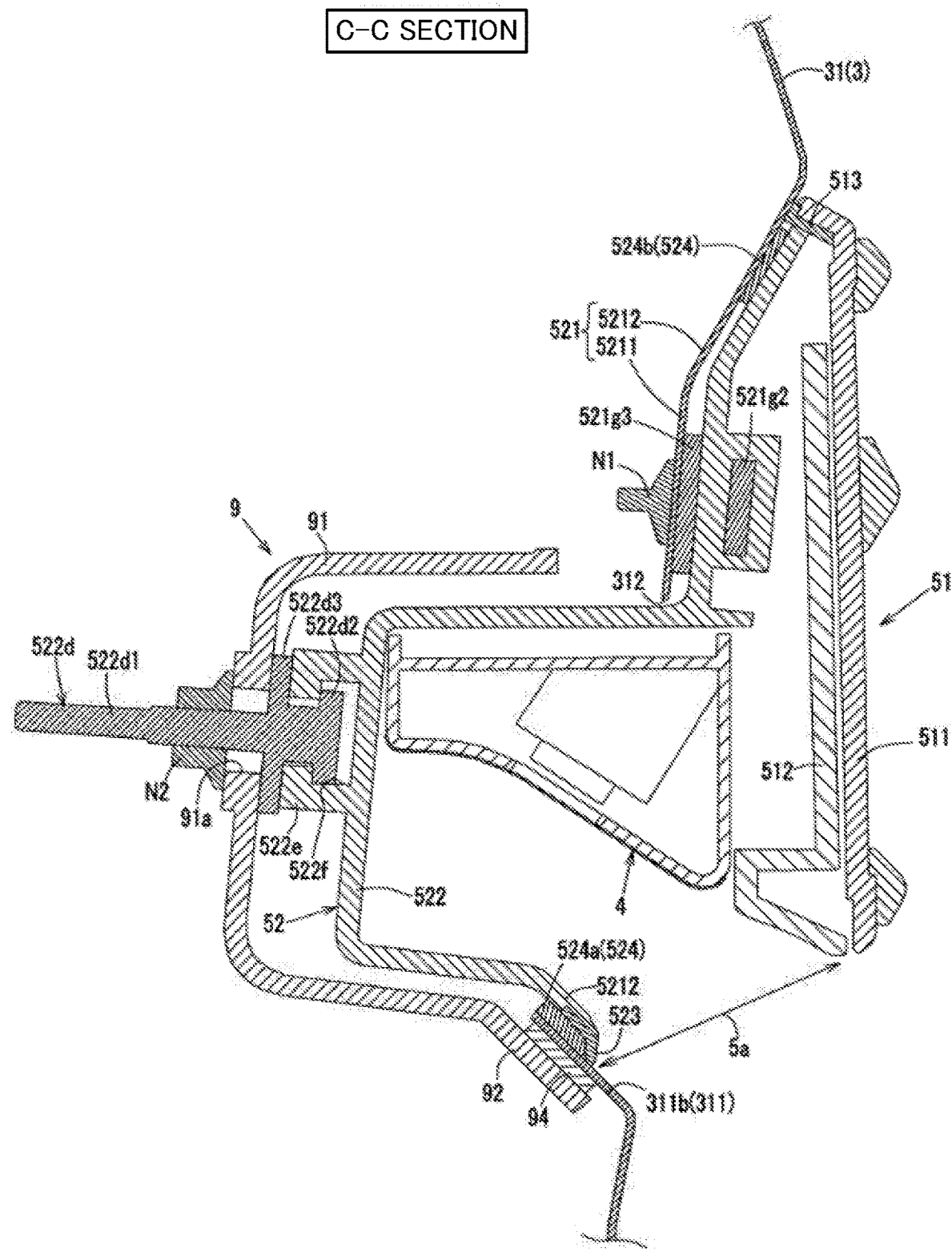
FIG. 10 is a sectional view taken along line C-C in FIG. 3B.

The accommodating recess 522 has through holes 522a (see FIG. 11), an opening 522b (see FIG. 8), a hook portion 522c (see FIG. 6), and the coupling bolts 522d (see FIG. 10). Screws B5 for fixing the door handle 4 are inserted through the through holes 522a. A wire 43 for the door handle 4 accommodated in the accommodating recess 522 is drawn out through the opening 522d. The wire 43 is fixed to the hook portion 522c. The coupling bolts 522d are coupled to the bracket 9.

For example, the through holes 522a are formed on the right and left sides of the upper peripheral wall of the accommodating recess 522, and the opening 522b is formed in the middle part of the upper peripheral wall of the accommodating recess 522. For example, the hook portion 522c is mounted near the opening 522b of the upper peripheral wall of the accommodating recess 522.

The coupling bolts 522d stand on the bottom of the accommodating recess 522 so as to project from the back side of the accommodating recess 522. More specifically, a total of three coupling bolts 522d, two in the upper part and one in the lower part, are provided on the bottom of the accommodating recess 522. The coupling bolt 522d includes a threaded portion 522d1, a head 522d2 formed at the base end of the threaded portion 522d1, and a flange portion 522d3 formed on the threaded portion 522d1 so as to be separated from the head 522d2. For example, the flange portion 522d3 has a disc shape and projects outward in the radial direction of the threaded portion 522d1 (see FIG. 10).

Fixing portions 522e for fixing the coupling bolt 522d are formed on the outer main surface of the bottom of the accommodating recess 522 (see FIGS. 6 and 10). The fixing portion 522e is a substantially U-shaped peripheral wall that opens on its one side. This peripheral wall has a retaining groove 522f formed in its inner peripheral surface so as to extend in the circumferential direction. Both ends of the retaining groove 522f open in both end faces of the peripheral wall.

The head 522d2 of the coupling bolt 522d is inserted into the inside of the peripheral wall from the open side of the peripheral wall, and the peripheral edge of the head 522d2 is retained by the retaining groove 522f, whereby the coupling bolt 522d is fixed to the bottom of the accommodating recess 522. In this fixed state, the threaded portion 522d1 of the coupling bolt 522d projects from the back side of the accommodating recess 522, and the peripheral wall is held between the head 522d2 and the flange portion 522d3 of the coupling bolt 522d.

The back-side case portion 521 includes the engaging portion 521a and positioning through holes 521b for positioning the outer case 511, and fixing through holes 521c through which the screws B1 for fixing the outer case 511 are screwed (see FIG. 5).

The engaging portion 521a is a portion that engages with the engaged portion 511h of the outer case 511 (see FIG. 8). The engaging portion 521a is formed in the upper part (i.e., a portion corresponding to the engaged portion 511h) of the inner peripheral surface of the outer peripheral wall 5212 of the back-side case portion 521. The engaging portion 521a stands from the inner peripheral surface of the outer peripheral wall 512 toward the front side of the back-side case portion 521. The half on the tip end side of the engaging portion 521a is bent upward. The half on the tip end side of the engaging portion 521a is bent upward. The half on the tip end side of the engaging portion 521a is inserted into the open lower surface of the engaged portion 511h, whereby the engaging portion 521a engages with the engaged portion 511h. The housing 52 and the outer case 511 are positioned relative to each other by this engagement.

The positioning through hole 521b is a hole through which the positioning projection 511f of the outer case 511 is fittingly inserted (see FIG. 11). The back-side case portion 521 has bottomed cylindrical boss 521b1 formed on the right and left sides (i.e., portions corresponding to the positioning projections 511*f*) of the upper part of the surface of the bottom wall 5211 so as to project from the upper part of the surface of the bottom wall 5211. Each boss 521*b*1 has the positioning through hole 521*b* in its tip end face. The positioning projections 511*f* are fittingly inserted in the positioning through holes 521*b*. The housing and the outer case 511 are also positioned relative to each other by this insertion.

The fixing through hole 521*c* is a hole through which the screw B1 for fixing the housing 52 to the fixing bosses 511*g* of the outer case 511 is inserted (see FIG. 13). The fixing through holes 521*c* are formed on the right and left sides (i.e., portions corresponding to the fixing bosses 511*g*) of the middle part in the vertical direction of the bottom wall 5211 of the back-side case portion 521. The screws B1 are inserted through the fixing through holes 521*c* from the back side of the housing 52 and are screwed into the holes 511*g*1 of the fixing bosses 511*g*, whereby the housing 52 is fixed to the outer case 511.

As described above, the back-side case portion 521 (i.e., the housing 52) has positioning portions (i.e., the engaging portion 521*a* and the positioning through holes 521*b*), and the outer case 511 has corresponding positioning portions (i.e., the engaged portion 511*h* and the positioning projections 511*f*). With the positioning portions of the outer case 511 being positioned in the positioning portions of the back-side case portion 521, the outer case 511 is fixed to the back-side case portion 521 by the screws B1. The housing 52 is thus easily positioned and fixed to the outer case 511.

The back-side case portion 521 has positioning projections 521*d* for positioning the fixing base 512 and fixing through holes 521*e*, 521*f* for fixing the fixing base 512 (see FIG. 5).

The positioning projection 521*d* is a projection that is fittingly inserted through the hole 512*b*1 of the positioning boss 512*b* of the fixing base 512 (see FIG. 11). The positioning projections 521*d* stand on the right and left sides of the surface of the bottom wall 5211 of the back-side case portion 521. For example, the positioning projections 521*d* are located below the positioning through holes 521*b*. The positioning projections 521*d* are fittingly inserted through the holes 512*b*1 of the fixing base 512, whereby the housing 52 and the fixing base 512 are positioned relative to each other.

The fixing through hole 521*e* is a through hole through which the screw B2 is inserted, and the screw B2 is screwed into the hole 512*c*1 of the fixing boss 521*c* of the fixing base 512 (see FIG. 8). The fixing through hole 521*e* is formed in the middle part (i.e., a portion corresponding to the fixing boss 512*c*) in the lateral direction of the upper part of the surface of the bottom wall 5211 of the back-side case portion 521. The screw B2 is inserted through the fixing through hole 521*e* from the back side of the housing 52 and screwed into the hole 512*c*1 of the fixing boss 512*c*, whereby the housing 52 is fixed to the fixing base 512.

The fixing through hole 521*f* is a through hole through which the screw B3 is inserted, and the screw B3 is screwed through the hole 512*d*1 of the fixing piece 512*d* of the fixing base 512 (see FIG. 14). The fixing through holes 521*f* are formed in the right and left ends (i.e., portions corresponding to the holes 512*d*1 of the fixing pieces 512*d*) of the outer peripheral wall 5212 of the back-side case portion 521. For example, the fixing through holes 521*f* are formed below the fixing through holes 521*f*. The screws B3 are inserted through the fixing through holes 521*f* from the back side of the housing 52 and screwed through the holes 512*d*1 of the fixing pieces 512*d*, whereby the housing 52 is fixed to the fixing base 512.

As described above, the back-side case portion 521 (i.e., the housing 52) has positioning portions (i.e., the positioning projections 521*d*), and the fixing base 512 has corresponding positioning portions (i.e., the positioning bosses 512*b*). With the positioning portions of the back-side case portion 521 being positioned in the positioning portions of the fixing base 512, the back-side case portion 521 is fixed to the fixing base 512 by the screws B2, B3, whereby the back-side case portion 521 is easily positioned and fixed to the fixing base 512.

The back-side case portion 521 has the fixing bolts 521*g* and the fixing pins 521*h* for fixing the outer panel 31 (see FIG. 4).

For example, the back-side case portion 521 has two fixing bolts 521*g*, and the two fixing bolts 521*g* stand next to each other in the lateral direction on the upper part of the back surface (i.e., the main surface on the outer panel 31 side) of the back-side case portion 521. The fixing bolt 521*g* includes a threaded portion 521*g*1, a head 521*g*2 formed at the base end of the threaded portion 521*g*1, and a flange portion 521*g*3 formed on the threaded portion 521*g*1 so as to be located below and separated from the head 521*g*2 (see FIG. 9). For example, the flange portion 521*g*3 has a disc shape and projects outward in the radial direction of the threaded portion 521*g*1.

With the fixing bolts 521*g* being mounted in the back surface of the back-side case portion 521, the heads 521*g*2 are buried in the back-side case portion 521. The flange portions 521*g*3 contact the back surface of the back-side case portion 521. The threaded portions 521*g*1 stand on the back surface of the back-side case portion 521.

With the threaded portions 521*g*1 of the fixing bolts 521*g* being inserted through the through holes 313 of the outer panel 31 from the front side of the outer panel 31, the nuts N1 are screwed onto the threaded portions 521*g*1 from the back side of the outer panel 31, so that the outer panel 31 is held between the flange portions 521*g*3 and the nuts N1. The back-side case portion 521 (i.e., the decoration member 5) is thus fixed to the outer panel 31 (see FIG. 9).

For example, the back-side case portion 521 has two fixing pins 521*h*, and the two fixing pints 521*h* stand next to each other in the lateral direction on the upper part of the back surface (i.e., the main surface on the outer panel 31 side) of the back-side case portion 521. For example, the fixing pins 521*h* are located on the right and left sides of the two fixing bolts 521*g*. The fixing pin 521*h* includes a pin body 521*h*1 and a fixing retaining part 521*h*2 (see FIG. 11). The pin body 521*h*1 has a bar shape, stands on the back surface of the back-side case portion 521, and is integral with the back-side case portion 521. The fixing retaining part 521*h*2 is made of a resin material and includes an inner cylinder portion 521*h*3 mounted on the pin body 521*h*1 and an outer cylinder portion 521*h*4 retained in the through hole 314 of the outer panel 31.

The outer cylinder portion 521*h*4 is concentrically located radially outside the inner cylinder portion 521*h*3 so as to be separated from the inner cylinder portion 521*h*3. The tip end of the outer cylinder portion 521*h*4 is connected to the tip end of the inner cylinder portion 521*h*3. The outer cylinder portion 521*h*4 has a retaining protruding portion 521*h*5 and a flange portion 521*h*6. The retaining protruding portion 521*h*5 has a substantially triangular shape and is formed in the outer peripheral surface of the outer cylinder portion 521*h*4 so as to extend in the axial direction of the outer cylinder portion 521*h*5. The flange portion 521*h*6 is formed around the base end of the outer cylinder portion 521*h*4 and projects outward in the radial direction of the outer cylinder portion 521*h*4.

With the fixing retaining part 521*h*2 being mounted on the pin body 521*h*1, the fixing retaining part 521*h*2 is pressed into the through hole 314 of the outer panel 31, whereby the peripheral edge of the through hole 314 is held between the retaining protruding portion 521*h*5 and the flange portion 521*h*6 of the fixing retaining part 521*h*2. The back-side case portion 521 (i.e., the decoration member 5) is thus also fixed to the outer panel 31 by the peripheral edge of the through hole 314 being held between the retaining protruding portion 521*h*5 and the flange portion 521*h*6.

Door Handle 4

As shown in FIGS. 5 and 8, the door handle 4 is intended to detect user's operation of unlocking the vehicle door 3 by his/her finger(s), and includes an electric door switch 41 (see FIG. 8) for detecting user's unlock operation with his/her finger(s) and a case 42 accommodating the electric door switch 41. The lateral width of the door handle 4 is substantially the same as (more specifically, slightly smaller than) that of the decoration member 5.

The case 42 is made of, e.g., resin and is substantially in the shape of a rectangular parallelepiped box. The vertical width of the case 42 is about half the vertical width of the open surface of the accommodating recess 522 of the housing 52. The lateral width of the case 42 is substantially the same as that of the accommodating recess 522, and the depth (i.e., the width in the longitudinal direction of the vehicle) of the case 42 is substantially the same as the depth of the accommodating recess 522. That is, the case 42 is formed so that it can be fitted in the upper half of the accommodating recess 522.

For example, the lower surface of the case 42 is tilted so that the lower surface of the case 42 is located at a lower position on the open surface side of the accommodating recess 522 than on the bottom side of the accommodating recess 522 (see FIG. 8). The case 42 has an opening 42*a* in its lower surface, and a rubber sheet 42*b* is disposed so as to close the opening 42*a*. The electric door switch 41 is accommodated in the case 42 so as to be located on the back side of the opening 42*a*. That is, the user can perform the unlock operation by turning on the electric door switch 41 with his/her finger(s) via the rubber sheet 42*b*.

The case 42 has the stopper portions 42*c* (see FIGS. 5 and 14) and through holes 42*d* (see FIG. 11). The stopper portions 42*c* are retained by the fixing retaining portions 512*e* of the fixing base 512, and the screws B5 for fixing the case 42 to the upper wall of the accommodating recess 522 of the housing 52 are screwed in the through holes 42*d*.

For example, the case 42 has two stopper portions 42*c*, and the two stopper portions 42*c* are formed next to each other in the lateral direction on the side surface on the front side (i.e., the fixing base 512 side) of the case 42 (see FIG. 14). Each stopper portion 42*c* is formed as a pair of stopper pawls 42*c*1. The pair of stopper pawls 42*c*1 stand on the side surface on the front side of the case 42 so as to be separated from each other in the lateral direction of the case 42. Each stopper pawl 42*c*1 has a pawl portion 42*c*2 at its tip end. The pawl portions 42*c*2 of the pair of stopper pawls 42*c*1 project in opposite directions to each other. Each pair of stopper pawls 42*c*1 are wide in the vertical direction of the case 42.

The stopper portions 42*c* are slid within the fixing retaining portions 512*e* of the fixing base 52 from the upper side toward the lower side of the fixing retaining portions 512*e* and thus retained therein. That is, the pawl portions 42*c*2 of each pair of stopper pawls 42*c*1 are inserted into the retaining grooves 512*e*2 of the pair of retaining walls 512*e*1 of the fixing retaining portion 512*e*, whereby the stopper portions 42*c* are retained in the fixing retaining portions 512*e*. The door handle 4 is thus fixed to the fixing base 512 (and therefore the decoration member 5).

The through holes 42*d* are formed on the right and left sides (i.e., portions corresponding to the through holes 522*a* of the housing 52) of the upper wall of the case 42 (see FIG. 11). The screws B5 are inserted through the through holes 522*a* from the outside of the accommodating recess 522 and screwed into the through holes 42*d*, whereby the door handle 4 is accommodated in the accommodating recess 522 of the housing 52 and fixed to the upper wall of the accommodating recess 522. The door handle 4 is therefore accommodated in the accommodating recess 522 and fixed to the upper wall of the accommodating recess 522 by the fixing with the screws B5 and by the stopper portions 42*c* being retained in the fixing retaining portions 512*e*. With the door handle 4 being accommodated in the accommodating recess 522 and fixed to the upper wall of the accommodating recess 522, the wire 43 for the door handle 4 is drawn to the outside of the housing 52 through the opening 522*b* of the accommodating recess 522 and is fixed by the hook portion 522*c* (see FIGS. 4 and 8).

Bracket 9

As shown in FIGS. 4, 5, and 7, the bracket 9 includes a cover portion 91, a holding portion 92, reinforcing ribs 93, and an elastic member 94. The cover portion 91 covers the accommodating recess (coupling portion) 522 of the housing 52 from the back side of the accommodating recess 522. The holding portion 92 is formed at the outer peripheral edge of the cover portion 91. The reinforcing ribs 93 reinforce the holding portion 92. The elastic member 94 serves as a cushioning material between the holding portion 92 and the outer panel 31.

For example, the cover portion 91 is substantially in the shape of a rectangular parallelepiped that is open in its front surface and can accommodate the accommodating recess 522 of the housing 52. For example, the cover portion 91 is shaped so that it can be fitted on the accommodating recess 522.

The cover portion 91 includes through holes 91*a*, a recessed wiring path 91*b*, and a wiring opening 91*c*. The coupling bolts 522*d* of the accommodating recess 522 are inserted through the through holes 91*a*, the wire 43 for the door handle 4 is placed in the recessed wiring path 91*b*, and the wire 43 for the door handle 4 is inserted through the wiring opening 91*c*.

For example, the cover portion 91 has a total of three through holes 91*a* formed in the back wall of the cover portion 91, two next to each other in the lateral direction in the upper part and one in the middle in the lower part. That is, the through holes 91*a* are formed at positions corresponding to the three coupling bolts 522*d* of the decoration member 5. The recessed wiring path 91*b* is formed in the middle part in the lateral direction of the inner surface of the upper wall of the cover portion 91 so as to extend from the base end side to the tip end side of the upper wall and open in the tip end of the upper wall.

The accommodating recess (i.e., coupling portion) 522 projecting through the opening 312 of the outer panel 31 is accommodated in the cover portion 91, whereby the cover portion 91 covers substantially the entire accommodating recess 522 (see FIG. 10). With the accommodating recess 522 being covered by the cover portion 91, the coupling bolts 522*d* of the accommodating recess 522 extend through the through holes 91a of the cover portion 91. The nuts N2 are screwed on the coupling bolts 522d, whereby the coupling portion 522 is held between the nuts N2 and the flange portions 522d3 of the coupling bolts 522d. The cover portion 91 (and therefore the bracket 9) is thus coupled to the coupling portion 522. In this coupled state, the wire 43 for the door handle 4 extends to the outside of the bracket 9 through the recessed wiring path 91b of the cover portion 91 and the wiring opening 91c of the cover portion 91 (see FIG. 8).

The holding portion 92 is a portion that together with the outer peripheral wall 5212 of the housing 52 of the decoration member 5 holds the stepped peripheral wall 311b of the outer panel 31 therebetween (see FIG. 14). The holding portion 92 is formed along the outer peripheral edge of the cover portion 91 other than the upper edge thereof, namely along the right and left edges and the lower edge of the cover portion 91. That is, the holding portion 91 is formed only along a part of the outer peripheral edge of the cover portion 91 which overlaps the outer peripheral wall of the housing 52 (i.e., only along the right and left edges and the lower edge of the cover portion 91). The holding portion 92 projects outward in the radial direction of the cover portion 91 from the outer peripheral edge of the cover portion 91 and is tilted so that the outer periphery of the holding portion 92 is located closer to the front side of the holding portion 92 than the inner periphery of the holding portion 92 is.

As described above, the cover portion 91 is coupled to the coupling portion 522 of the housing 52, whereby the holding portion 92 together with the outer peripheral wall 5212 of the housing 52 holds the stepped peripheral wall 311b of the outer panel 31 therebetween. The decoration member 5 is thus fixed to the stepped recessed portion 311 of the outer panel 31.

As described above, the upper half of the decoration member 5 is fixed to the outer panel 31 by the fixing bolts 521g and the fixing pins 521h. Moreover, the lower half of the decoration member 5 is fixed to the outer panel 31 as the outer panel 31 is held between the outer peripheral wall 5212 of the housing 52 and the holding portion 92 of the bracket 9. The decoration member 5 is thus fixed to the stepped recessed portion 311.

The inner peripheral surface of the holding portion 92 is substantially concave in the longitudinal direction of the holding portion 92. The holding portion 92 has drain grooves 92a in the bottom part of the substantially concave inner peripheral surface. The drain grooves 92a extend from the base end side to the tip end side of the holding portion 92 and open on the base end side (i.e., the inner peripheral surface of the cover portion 91) and the tip end side of the driven grooves 92a. This allows water having entered the cover portion 91 to flow through the drain grooves 92a and be drained to the outside of the cover portion 91 through the open tip ends of the drain grooves 92a. The drain groove 92a has a substantially U-shaped or V-shaped section and is formed so as to be recessed in the inner peripheral surface of the holding portion 92 and to project from the outer peripheral surface of the holding portion 92.

The bracket 9 includes the reinforcing ribs 93 in the recessed corners formed in the holding portion 92 and the cover potion 91. For example, the reinforcing rib 93 has a substantially triangular shape as viewed from the side and extends in both the holding portion 92 and the cover portion 91. A plurality of reinforcing ribs 93 are formed at intervals in the longitudinal direction of the holding portion 92. Of the plurality of reinforcing ribs 93, the reinforcing ribs 93 formed in the right and left side surfaces of the cover portion 91 have a plate shape and the reinforcing ribs 93 formed in the lower surface of the cover portion 91 are formed by the drain grooves 92a.

The elastic member 94 is made of, e.g., urethane. The elastic member 94 is interposed between the holding portion 92 and the stepped peripheral wall 311b of the outer panel 31 and serves as a cushioning material. The elastic member 94 has a strip shape and extends along the edge on the tip end side of the inner peripheral surface of the holding portion 92.

Primary Effects

The vehicle door handle mounting structure 1 according to the present embodiment is a vehicle door handle mounting structure including: a vehicle door (e.g., a back door) 3 including an outer panel 31 having an opening 312; a decoration member 5 mounted on a front side of the outer panel 31 and having a coupling portion 522 that is placed in the opening 312 of the outer panel 31; a door handle 4 mounted in the decoration member 5; and a bracket 9 coupled to the coupling portion 522 from a back side of the outer panel 31 and, together with the decoration member 5, holding the outer panel 31 therebetween.

With this configuration, the door handle 4 is mounted in the decoration member 5 mounted on the outer panel 31 of the vehicle door 3. Accordingly, the decoration member 5 can also be used as the door handle 4. The coupling portion 522 of the decoration member 5 is placed in the opening 312 of the outer panel 31, the bracket 9 is coupled to the coupling portion 522 from a back side of the outer panel 31, and the outer panel 31 is held between the bracket 9 and the decoration member 5. The decoration member 5 is thus firmly fixed to the outer panel 31. Sufficient mounting rigidity of the decoration member 5 to the outer panel 31 (i.e., the vehicle door 3) is thus provided even if the decoration member 5 is narrow and cannot be fixed at many points to the outer panel 31 by fixing parts such as bolts and nuts.

In one aspect of the present disclosure, the decoration member 5 may have a decoration member body 51 and a housing 52 mounted on a back side of the decoration member body 51 and supporting the door handle 4. The housing 52 may have a back-side case portion 521 fixed to a back surface of the decoration member 5, and an accommodating recess formed so as to be recessed from a front side toward a back side of the back-side case portion 521 and accommodating the door handle 4. The accommodating recess 522 may project from the back side of the back-side case portion 521 to form the coupling portion 522.

With this configuration, the accommodating recess 522 of the decoration member 5 in which the door handle 4 is placed also serves as the coupling portion 522. Accordingly, the coupling portion 522 need not be provided separately, whereby reduction in size of the decoration member 5 is achieved.

In one aspect of the present disclosure, an outer peripheral edge (e.g., the outer peripheral wall 5212) of the decoration member 5 may be placed on the front side of the outer panel 31. The bracket 9 may have a holding portion 92 that is placed over the outer peripheral edge of the decoration member 5 from the back side of the outer panel 31. The outer panel 31 may be held between the outer peripheral edge of the decoration member 5 and the holding portion 92 of the bracket 9.

With this configuration, the outer peripheral edge of the decoration member 5 together with the bracket 9 holds the outer panel 31 therebetween. The outer panel 31 is thus stably held between the decoration member 5 and the bracket 9. Since the outer peripheral edge of the decoration member 5 is used to hold the outer panel 31, a relatively large region of the outer panel 31 can be held. The outer panel 31 is thus stably held between the decoration member 5 and the bracket 9.

In one aspect of the present disclosure, the outer panel 31 may have in its surface a stepped recessed portion 311 on which the decoration member 5 is mounted. A stepped peripheral wall 311*b* of the stepped recessed portion 311 may be tilted outward in a radial direction. The outer peripheral edge (e.g., the outer peripheral wall 5212) of the decoration member 5 may be placed on a front side of the stepped peripheral wall 311*b* of the stepped recessed portion 311. The holding portion 92 of the bracket 9 may be placed on a back side of the stepped peripheral wall 311*b* of the stepped recessed portion 311.

With this configuration, the stepped peripheral wall 311*b* of the stepped recessed portion 311 for mounting the decoration member 5, which is tilted outward in the radial direction, is used as a portion that is held between the decoration member 5 and the bracket 9. Accordingly, a relatively large region of the outer panel 31 can be used as the portion that is held between the decoration member 5 and the bracket 9. Since the stepped peripheral wall 311*b* used as the portion that is held between the decoration member 5 and the bracket 9 is tilted outward, the position of the portion that is held between the decoration member 5 and the bracket 9 is restrained from being displaced in the direction of a main surface of the outer panel 31.

In one aspect of the present disclosure, the coupling portion 522 of the decoration member 5 may be inserted through the opening 312 and project beyond the back side of the outer panel 31. The bracket may have a cover portion 91 coupled to the coupling portion 522 so as to cover the coupling portion 522, the holding portion 92 formed at an outer peripheral edge of the cover portion 91, and a reinforcing rib 93 formed in a recessed corner that is formed in the cover portion 91 and the holding portion 92.

With this configuration, the reinforcing rib 93 is formed in the recessed corner that is formed in the cover portion 91 and the holding portion 92 of the bracket 9. This improves rigidity of the holding portion 92 of the bracket 9. The outer panel 31 is thus firmly fixed between the bracket 9 and the decoration member 5.

In one aspect of the present disclosure, the bracket 9 may have a drain groove 92*a* in its inner peripheral surface. The drain groove 92*a* may extend in both the cover portion 91 and the holding portion 92, open in a tip end of the holding portion 92, and project toward outside of the bracket 9 to form the reinforcing rib 93.

With this configuration, since the bracket 9 has the drain groove 92*a* in its inner peripheral surface, water (e.g., water drops) having entered the bracket 9 is effectively drained to the outside of the bracket 9. Since the drain groove 92*a* forms the reinforcing rib 93, the drain groove 92*a* can also be used as the reinforcing rib 93.

In one aspect of the present disclosure, the bracket 9 may be placed over the decoration member 5 other than a part of the decoration member 5 (e.g., the upper half of the decoration member 5) which is mounted on the outer panel 31.

With this configuration, the bracket 9 is placed over the decoration member 5 (e.g., the lower half of the decoration member 5) other than the part of the decoration member 5 (e.g., the upper half of the decoration member 5) which is mounted on the outer panel 31. Accordingly, the portion of the outer panel 31 which is held between the bracket 9 and the decoration member 5 does not overlap the part of the decoration member 5 which is mounted on the outer panel 31. This allows the entire decoration member 5 to have uniform mounting rigidity on the outer panel 31. Since the bracket 9 is not placed on the entire back side of the decoration member 5, reduction in size of the bracket 9 is achieved.

In one aspect of the present disclosure, the decoration member 5 may be a mascot having substantially the same lateral width as (more specifically, slightly larger than) that of the door handle 4, and the door handle may have an electric door switch.

With this configuration, the mascot (i.e., a relatively narrow decoration member 5) can be fixed with high rigidity to the outer panel 31. Moreover, the door handle 4 has an electric door switch, which contributes to reduction in size of the mascot.

The present disclosure is not limited to the configuration of the above embodiment and can be carried out in various forms.

What is claimed is:

1. A vehicle door handle mounting structure for a vehicle door having an outer panel defining an opening, the mounting structure comprising:
    a decoration member mounted on a front side of the outer panel and having a coupling portion that is placed in the opening of the outer panel;
    a door handle mounted in the decoration member; and
    a bracket coupled to the coupling portion from a back side of the outer panel and, together with the decoration member, holding the outer panel therebetween;
    wherein
    an outer peripheral edge of the decoration member is placed on the front side of the outer panel;
    the bracket has a holding portion that is placed on the back side of the outer panel;
    the outer panel is held between the outer peripheral edge of the decoration member and the holding portion of the bracket;
    the coupling portion of the decoration member is inserted through the opening and projects beyond the back side of the outer panel,
    the bracket has a cover portion coupled to the coupling portion so as to cover the coupling portion, the holding portion formed at an outer peripheral edge of the cover portion, and a reinforcing rib formed in a recessed corner that is formed in the cover portion and the holding portion;
    the bracket has a drain groove in its inner peripheral surface, and
    the drain groove extends in both the cover portion and the holding portion, opens in a tip end of the holding portion, and projects toward outside of the bracket to form the reinforcing rib.

2. The vehicle door handle mounting structure of claim 1, wherein
    the decoration member has a decoration member body and a housing mounted on a back side of the decoration member body and supporting the door handle,
    the housing has a back-side case portion fixed to a back surface of the decoration member, and an accommodating recess formed so as to be recessed from a front side toward a back side of the back-side case portion and accommodating the door handle, and
    the accommodating recess projects from the back side of the back-side case portion to form the coupling portion.

3. The vehicle door handle mounting structure of claim 1, wherein the outer panel has in its surface a stepped recessed portion on which the decoration member is mounted, and a stepped peripheral wall of the stepped recessed portion is tilted outward in a radial direction, the outer peripheral edge of the decoration member is placed on a front side of the stepped peripheral wall of the stepped recessed portion, and the holding portion of the bracket is placed on a back side of the stepped peripheral wall of the stepped recessed portion.

4. The vehicle door handle mounting structure of claim 1, wherein the bracket is placed over the coupling portion at a part of the decoration member which is not mounted on the outer panel.

5. The vehicle door handle mounting structure of claim 1, wherein the decoration member is a mascot having substantially the same lateral width as that of the door handle, and the door handle has an electric door switch.

\* \* \* \* \*